(12) United States Patent
Kvatinsky et al.

(10) Patent No.: US 12,230,306 B2
(45) Date of Patent: Feb. 18, 2025

(54) ASYNCHRONOUS TRUE RANDOM NUMBER GENERATOR USING STT-MTJ

(71) Applicant: TECHNION RESEARCH & DEVELOPMENT FOUNDATION LIMITED, Haifa (IL)

(72) Inventors: Shahar Kvatinsky, Hanaton (IL); Ben Perach, Bet-Hashita (IL)

(73) Assignee: TECHNION RESEARCH &DEVELOPMENT FOUNDATION LIMITED, Haifa (IL)

( * ) Notice: Subject to any disclaimer, the term of this patent is extended or adjusted under 35 U.S.C. 154(b) by 939 days.

(21) Appl. No.: 17/297,143

(22) PCT Filed: Dec. 2, 2019

(86) PCT No.: PCT/IL2019/051322
§ 371 (c)(1),
(2) Date: May 26, 2021

(87) PCT Pub. No.: WO2020/115741
PCT Pub. Date: Jun. 11, 2020

(65) Prior Publication Data
US 2022/0020410 A1    Jan. 20, 2022

Related U.S. Application Data

(60) Provisional application No. 62/774,258, filed on Dec. 2, 2018.

(51) Int. Cl.
*G11C 11/16*     (2006.01)
*G06F 7/58*      (2006.01)
(Continued)

(52) U.S. Cl.
CPC ............ *G11C 11/161* (2013.01); *G06F 7/588* (2013.01); *G11C 11/1673* (2013.01); *H03K 3/84* (2013.01); *H04L 9/0869* (2013.01)

(58) Field of Classification Search
CPC ............. G11C 11/161; G11C 11/1673; G11C 11/1659; G11C 11/1675; G06F 7/588; H03K 3/84; H04L 9/0869; H04L 9/0662
(Continued)

(56) References Cited

U.S. PATENT DOCUMENTS 9,298,946 B2    3/2016    Zhu et al.

OTHER PUBLICATIONS

B. Perach and S. Kvatinsky, "STT-ANGIE: Asynchronous True Random Number GEnerator Using STT-MTJ," 2019 Design, Automation & Test in Europe Conference & Exhibition (DATE), 2019, pp. 264-267, doi: 10.23919/DATE.2019.8715257.
(Continued)

*Primary Examiner* — Tan V Mai
(74) *Attorney, Agent, or Firm* — The Roy Gross Law Firm, LLC; Roy Gross

(57) ABSTRACT

A method, comprising: providing an electrical energy source having a specified amount of electrical energy; connecting an array comprising n magnetic tunnel junctions (MTJ) in parallel to said electrical energy source, wherein each of said MTJs is at a high resistance initial state; discharging said specified energy amount through said MTJs, thereby causing a random subset of said MTJs to switch to a lower resistance state; determining a post-discharging resistance state of each of the MTJs; and assigning a logical state to each of said MTJs corresponding to said resistance state of said MTJ.

17 Claims, 15 Drawing Sheets

(51) Int. Cl.
H03K 3/84 (2006.01)
H04L 9/08 (2006.01)

(58) Field of Classification Search
USPC .......................................................... 708/255
See application file for complete search history.

(56) References Cited

OTHER PUBLICATIONS

B. Perach and S. Kvatinsky, "An Asynchronous and Low-Power True Random Number Generator Using STT-MTJ," in IEEE Transactions on Very Large Scale Integration (VLSI) Systems, vol. 27, No. 11, pp. 2473-2484, Nov. 2019, doi: 10.1109/TVLSI.2019.2927816.
T. L. Gilbert, "A phenomenological theory of damping in ferromagnetic materials," in IEEE Transactions on Magnetics, vol. 40, No. 6, pp. 3443-3449, Nov. 2004, doi: 10.1109/TMAG.2004.836740.
J. L. Garcia-Palacios and F. J. Lazaro, "Langevin-dynamics study of the dynamical properties of small magnetic particles," Phys. Rev. B, Condens. Matter, vol. 58, pp. 14937-14958, Dec. 1998; https://doi.org/10.1103/PhysRevB.58.14937.
J. C. Slonczewski, "Current-driven excitation of magnetic multilayers," J. Magn. Magn. Mater., vol. 159, Nos. 1-2, pp. L1-L7, 1996; https://doi.org/10.1016/0304-8853(96)00062-5.
A. F. Vincent, N. Locatelli, J. O. Klein, W. S. Zhao, S. Galdin-Retailleau, and D. Querlioz, "Analytical macrospin modeling of the stochastic switching time of spin-transfer torque devices," IEEE Trans. Electron Devices, vol. 62, No. 1, pp. 164-170, Jan. 2015; doi: 10.1109/TED.2014.2372475.
Y. Zhang et al., "Compact Modeling of Perpendicular-Anisotropy CoFeB/MgO Magnetic Tunnel Junctions," in IEEE Transactions on Electron Devices, vol. 59, No. 3, pp. 819-826, Mar. 2012, doi: 10.1109/TED.2011.2178416.
Y. Qu, J. Han, B. F. Cockburn, W. Pedrycz, Y. Zhang and W. Zhao, "A true random number generator based on parallel STT-MTJs," Design, Automation & Test in Europe Conference & Exhibition (DATE), 2017, 2017, pp. 606-609, doi: 10.23919/DATE.2017.7927058.
Y. Qu et al., "Variation-Resilient True Random Number Generators Based on Multiple STT-MTJs," in IEEE Transactions on Nanotechnology, vol. 17, No. 6, pp. 1270-1281, Nov. 2018, doi: 10.1109/TNANO.2018.2873970.
Hochul Lee, Farbod Ebrahimi, Pedram Khalili Amiri, and Kang L. Wang , "Design of high-throughput and low-power true random number generator utilizing perpendicularly magnetized voltage-controlled magnetic tunnel junction", AIP Advances 7, 055934 (2017) https://doi.org/10.1063/1.4978320.
Vodenicarevic, Damir & Locatelli, Nicolas & Mizrahi, Alice & Friedman, Joseph & Vincent, Adrien & Romera, Miguel & Fukushima, Akio & Yakushiji, Kay & Kubota, Hitoshi & Yuasa, Shinji & Tiwari, Sandip & Grollier, Julie & Querlioz, Damien. (2017). Low-Energy Truly Random Number Generation with Superparamagnetic Tunnel Junctions for Unconventional Computing. Physical Review Applied. 8. 054045. 10.1103/PhysRevApplied.8.054045.
S. Ghosh, "Spintronics and security: Prospects, vulnerabilities, attack models, and preventions," Proc. IEEE, vol. 104, No. 10, pp. 1864-1893, Oct. 2016.). doi: 10.1109/JPROC.2016.2583419.
Andrew L. Rukhin, Lawrence E. Bassham, Juan Soto, James R. Nechvatal, Miles E. Smid, Elaine B. Barker, Stefan D. Leigh, Mark Levenson, Mark Vangel, David L. Banks, Nathanael Alan Heckert, James F. Dray, and San Vo. 2010. SP 800-22 Rev. 1a. A Statistical Test Suite for Random and Pseudorandom Number Generators for Cryptographic Applications. Technical Report. National Institute of Standards & Technology, Gaithersburg, MD, USA.
V. Drewello, J. Schmalhorst, A. Thomas, and G. Reiss, "Evidence for strong magnon contribution to the TMR temperature dependence in MgO based tunnel junctions," Phys. Rev. B, Condens. Matter, vol. 77, No. 1, Jan. 2008, Art. No. 014440.

Jing Li, Charles Augustine, Sayeef Salahuddin, and Kaushik Roy. 2008. Modeling of failure probability and statistical design of spin-torque transfer magnetic random access memory (STT MRAM) array for yield enhancement. In Proceedings of the 45th annual Design Automation Conference (DAC '08). Association for Computing Machinery, New York, NY, USA, 278-283. DOI:https://doi.org/10.1145/1391469.1391540.
Q. Dong, "A 1 Mb 28 nm STT-MRAM with 2.8 ns read access time at 1.2 V VDD using single-cap offset-cancelled sense amplifier and in-situ self-write-termination," in IEEE Int. Solid-State Circuits Conf. (ISSCC) Dig. Tech. Papers, Feb. 2018, pp. 480-482.
K. Yang, D. Fick, M. B. Henry, Y. Lee, D. Blaauw and D. Sylvester, "16.3 A: 23Mb/s 23pJ/b fully synthesized true-random-number generator in 28nm and 65nm CMOS," 2014 IEEE International Solid-State Circuits Conference Digest of Technical Papers (ISSCC), 2014, pp. 280-281, doi: 10.1109/ISSCC.2014.6757434.
S. Srinivasan et al., "2.4GHz 7mW all-digital PVT-variation tolerant True Random Number Generator in 45nm CMOS," 2010 Symposium on VLSI Circuits, 2010, pp. 203-204, doi: 10.1109/VLSIC.2010.5560296.
E. I. Vatajelu, G. Di Natale and P. Prinetto, "STT-MTJ-based TRNG with on-the-fly temperature/current variation compensation," 2016 IEEE 22nd International Symposium on On-Line Testing and Robust System Design (IOLTS), 2016, pp. 179-184, doi: 10.1109/IOLTS.2016.7604694.
A. Fukushima et al. Spin Dice: A Scalable Truly Random Number Generator Based on Spintronics. 2014. Appl. Phys. Express 7 083001; https://iopscience.iop.org/article/10.7567/APEX.7.083001/pdf.
S. Oosawa, T. Konishi, N. Onizawa and T. Hanyu, "Design of an STT-MTJ based true random number generator using digitally controlled probability-locked loop," 2015 IEEE 13th International New Circuits and Systems Conference (NEWCAS), 2015, pp. 1-4, doi: 10.1109/NEWCAS.2015.7182089.
Jiang, H., Belkin, D., Savel'ev, S.E et al. A novel true random number generator based on a stochastic diffusive memristor. Nat Commun 8, 882 (2017). https://doi.org/10.1038/s41467-017-00869-x.
Zhang T, Yin M, Xu C, Lu X, Sun X, Yang Y, Huang R. High-speed true random number generation based on paired memristors for security electronics. Nanotechnology. Nov. 10, 2017;28(45):455202. doi: 10.1088/1361-6528/aa8b3a. PMID: 28885186.
Mngjie Lao, Qianying Tang, Chris H. Kim, and Keshab K. Parhi. 2016. Beat Frequency Detector-Based High-Speed True Random Number Generators: Statistical Modeling and Analysis. J. Emerg. Technol. Comput. Syst. 13, 1, Article 9 (Jan. 2017), 25 pages. https://doi.org/10.1145/2866574.
Yandan Wang, Wei Wen, Hai Li, and Miao Hu. 2015. A Novel True Random Number Generator Design Leveraging Emerging Memristor Technology. In Proceedings of the 25th edition on Great Lakes Symposium on VLSI (GLSVLSI 15). Association for Computing Machinery, New York, NY, USA, 271-276. https://doi.org/10.1145/2742060.2742088.
Y. Wang, H. Cai, L. A. B. Naviner, J. -O. Klein, Jianlei Yang and W. Zhao, "A novel circuit design of true random number generator using magnetic tunnel junction," 2016 IEEE/ACM International Symposium on Nanoscale Architectures (NANOARCH), 2016, pp. 123-128, doi: 10.1145/2950067.2950108.
S. Ghosh, "Spintronics and Security: Prospects, Vulnerabilities, Attack Models, and Preventions," in Proceedings of the IEEE, vol. 104, No. 10, pp. 1864-1893, Oct. 2016, doi: 10.1109/JPROC.2016.2583419.
Vodenicarevic, D., Locatelli, N., Mizrahi, A., Friedman, J. S., Vincent, A. F., Romera, M., . . . Querlioz, D. (2017). Low-Energy Truly Random Number Generation with Superparamagnetic Tunnel Junctions for Unconventional Computing. Physical Review Applied, 8(5). doi: 10.1103/physrevapplied.8.054045.
E. I. Vatajelu, G. Di Natale and P. Prinetto, "Security primitives (PUF and TRNG) with STT-MRAM," 2016 IEEE 34th VLSI Test Symposium (VTS), 2016, pp. 1-4, doi: 10.1109/VTS.2016.7477292.
PCT International Search Report for International Application No. PCT/IL2019/051322, mailed Mar. 16, 2020, 3pp.

(56) References Cited

OTHER PUBLICATIONS

PCT Written Opinion for International Application No. PCT/IL2019/051322, mailed Mar. 16, 2020, 5pp.

ASYNCHRONOUS TRUE RANDOM NUMBER GENERATOR USING STT-MTJ

CROSS REFERENCE TO RELATED APPLICATIONS

This application is a National Phase of PCT Patent Application No. PCT/IL2019/051322 having International filing date of Dec. 2, 2019, which claims the benefit of priority under 35 USC § 119 (e) of U.S. Provisional Patent Application No. 62/774,258 filed Dec. 2, 2018, the contents of which are all incorporated herein by reference in their entirety.

FIELD OF THE INVENTION

The invention relates generally to the field of true random number generators.

BACKGROUND

A crucial part of cryptographic algorithms is the generation of the cryptographic keys. The key of a cryptographic algorithm is the secret of the encryption scheme. The algorithm itself is assumed to be publicly known, and the key is the only missing information needed to reveal the encrypted data. Hence, an adversary will try to obtain the key. Since the key is of a finite size, the number of possible values for the key is finite as well, and if this number is too small, an adversary can try them all. Additionally, if the adversary has partial knowledge of the key, such as some mathematical conditions between the key bits, this information can be used to reduce the number of options. Hence, it is desirable to generate a random key with a uniform distribution on all of its possibilities, so an adversary will have to try all of the options without a defined order. Processes that can generate a random number as the key are called Random Number Generators (RNGs).

One type of RNG is a TRNG, a true random number generator, which is based on a physically random process (e.g., thermal noise), wherein the TRNG translates the physical random into a usable form, such as digital numbers. The TRNG approach for generating random numbers is attractive because the generated number cannot be inferred from the state of the system, but rather can only be predicted from the distribution of the physical random process.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method, comprising: providing an electrical energy source having a specified amount of electrical energy; connecting an array comprising n magnetic tunnel junctions (MTJ) in parallel to said electrical energy source, wherein each of said MTJs is at a high resistance initial state; discharging said specified energy amount through said MTJs, thereby causing a random subset of said MTJs to switch to a lower resistance state; determining a post-discharging resistance state of each of the MTJs; and assigning a logical state to each of said MTJs corresponding to said resistance state of said MTJ.

In some embodiments, the assigning comprises assigning a logical '1' to each MTJ in said random subset, and a logical '0' to all other MTJs.

In some embodiments, the method further comprises arranging said 1s and said 0s into an n-bit word, wherein said n-bit word is a true random word.

In some embodiments, the arranging is based on a sequence of said MTJs in said array.

In some embodiments, a number of MTJs to be included in said random subset is determined based, at least in part, on at least one of: (i) the number n of said MTJs in said array; and (ii) said specified amount of electrical energy.

In some embodiments, the specified amount of electrical energy is set so as to cause a desired number of said MTJs to switch to said lower resistance state.

In some embodiments, an earliest time of said determining of said post-discharging resistance state of each of said MTJs is calculated based, at least in part, on said specified energy amount.

In some embodiments, the electrical energy source is a capacitor, and wherein said specified energy amount is defined by an initial voltage of said capacitor.

In some embodiments, the high resistance state includes a free layer of said MTJs being anti-parallel to a fixed layer of said MTJ.

In some embodiments, the low resistance state includes a free layer of said MTJs being parallel to a fixed layer of said MTJ.

In some embodiments, the method further comprises setting each of said MTJs to said initial high-resistance state.

In some embodiments, the discharging is effected by switching said electrical energy source to a discharging state using at least one transistor.

In some embodiments, the determining comprises applying a small current through each of said MTJs and using a sense amplifier to determine the resistance state of each of said MTJs.

In some embodiments, the discharging comprises a complete discharging of said electrical energy source.

There is also provided, in an embodiment, a system, comprising an electrical energy source having a specified amount of electrical energy; an array comprising n magnetic tunnel junctions (MTJ) connected in parallel to said electrical energy source; a switch configured to permit said specified amount of electrical energy to be discharged through said MTJs; and a sensing module configured to determine a resistance state of each of said MTJs.

In some embodiments, each of the MTJs is at a high resistance initial state.

In some embodiments, the specified amount of electrical energy is set so as to cause a desired number of said MTJs in said array to switch to said lower resistance state, based, at least in part, on said number n of said MTJs in said array.

In some embodiments, the system is used for generating an n-bit true random word, by: (i) discharging said specified amount of electrical energy through said MTJs; (ii) applying said sensing module to determine a post-discharging resistance state of each of the MTJs; (iii) assigning a logical state of '1' or '0' to each of said MTJs corresponding to said post-discharging resistance state of said MTJ; and (iv) arranging said 1s and said 0s into an n-bit word.

In some embodiments, the arranging is based on a sequence of said MTJs in said array.

In some embodiments, an earliest time of said determining of said post-discharging resistance state of each of said MTJs is calculated based, at least in part, on said specified energy amount.

In some embodiments, the electrical energy source is a capacitor, and wherein said specified energy amount is defined by an initial voltage of said capacitor.

In some embodiments, the high resistance state includes a free layer of said MTJs being anti-parallel to a fixed layer of said MTJ.

In some embodiments, the low resistance state includes a free layer of said MTJs being parallel to a fixed layer of said MTJ.

In some embodiments, the switch comprises at least one transistor.

In some embodiments, the sensing module comprises a sense amplifier.

In some embodiments, the discharging comprises a complete discharging of said electrical energy source.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

Figure 6A:
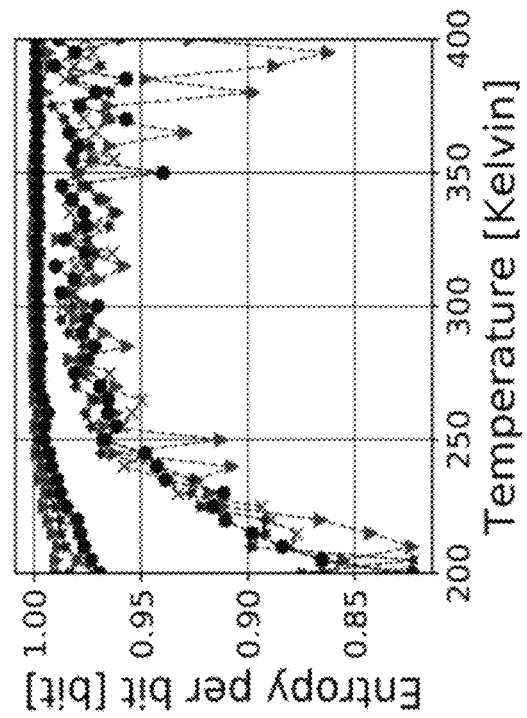
FIGS. 6A and 6B are graphs of the entropy per bit as a function of temperature for a non-changing MTJ resistance and including a change in MTJ resistance, where $R_{on}$ is constant and $$TMR = \frac{R_{off} - R_{on}}{R_{on}}$$
Figure 6B:
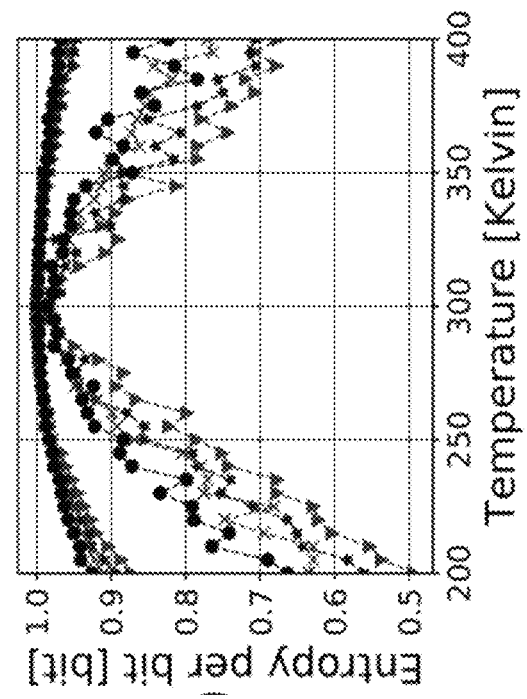
Figure 6D:
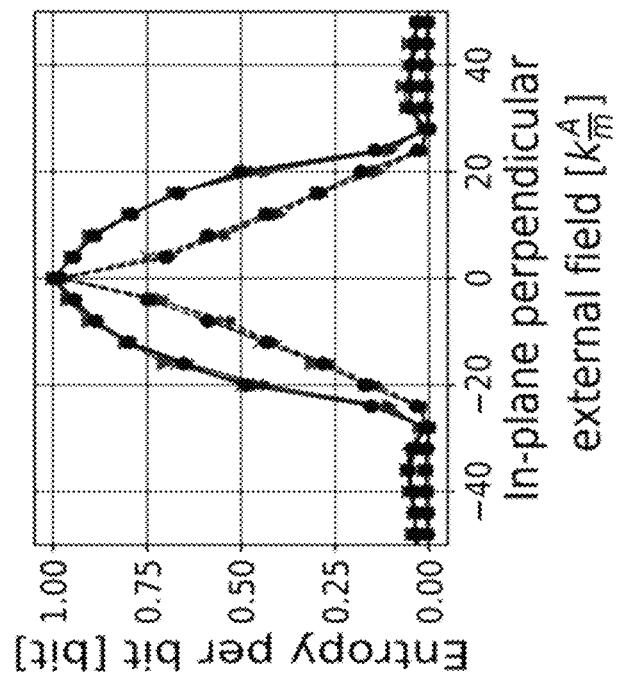
Figure 6C:
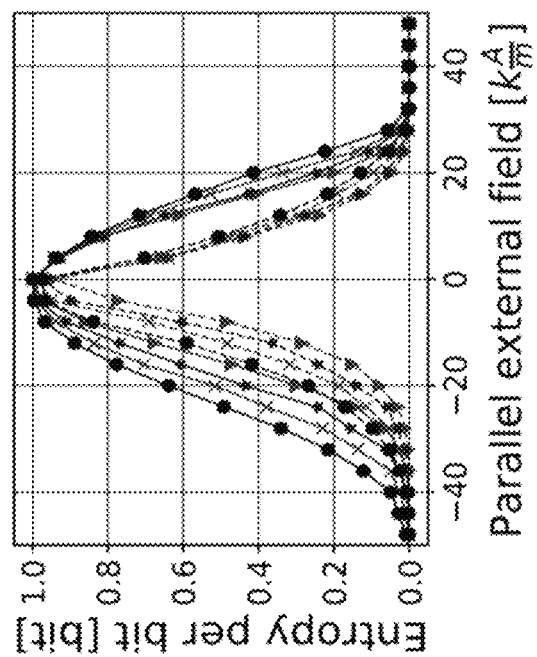
Figures 6E, 6F:
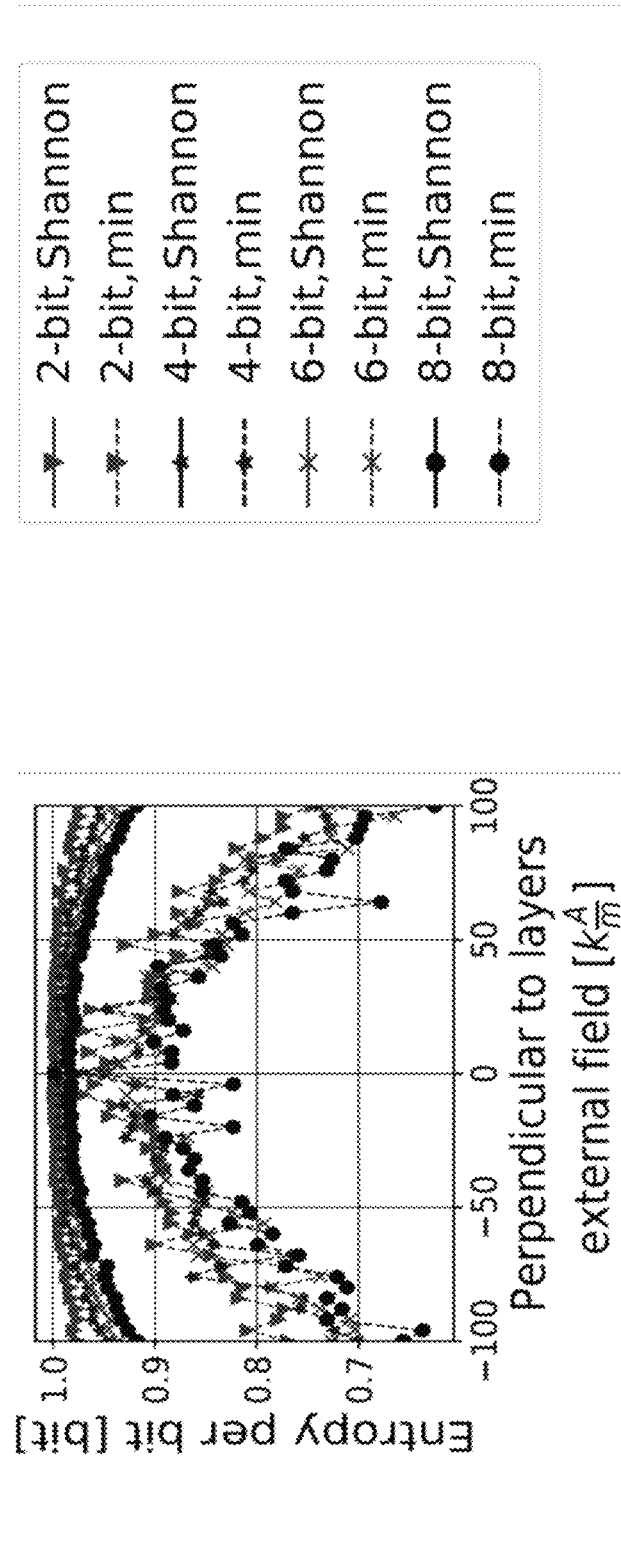
Figure 7A:
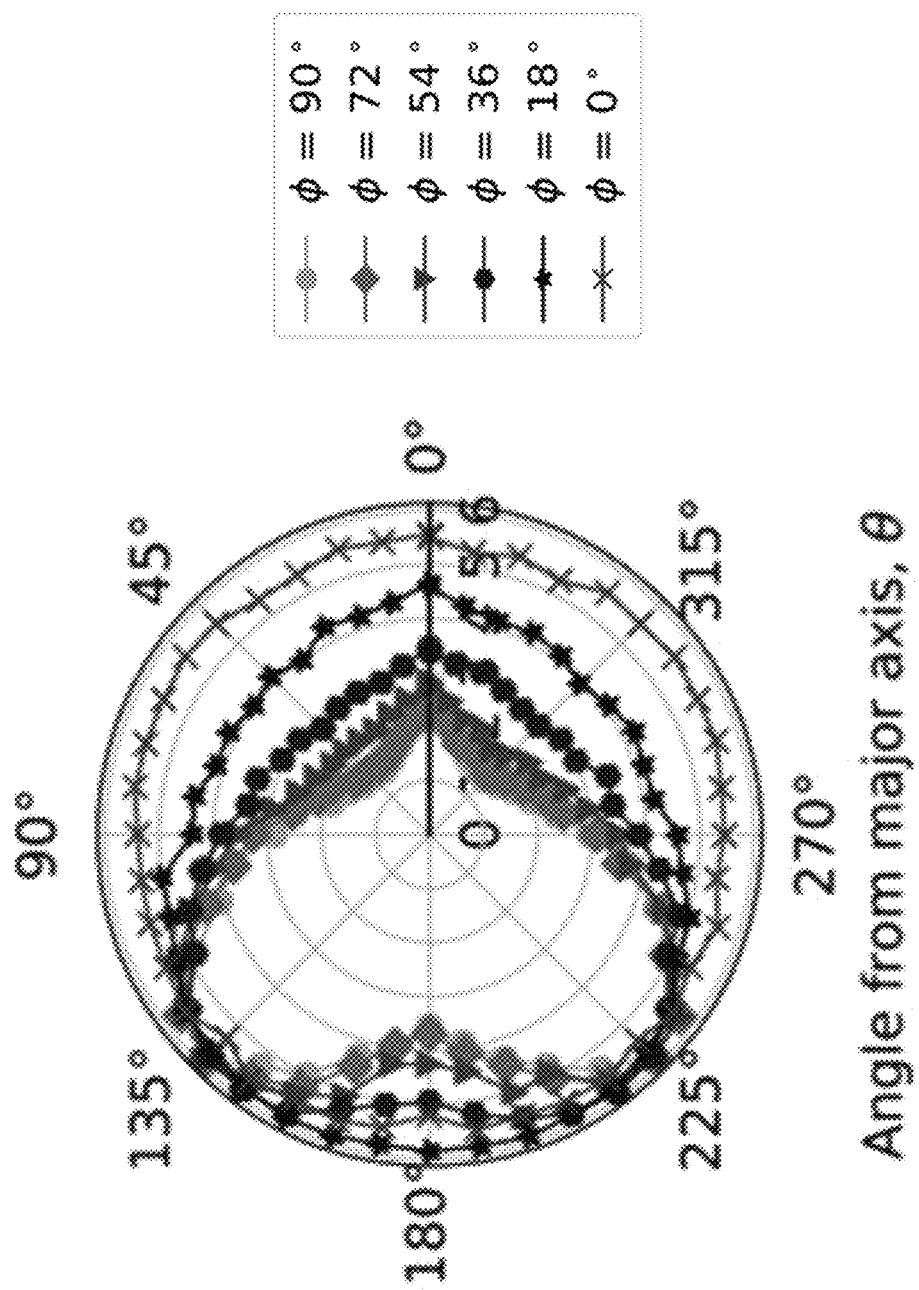
Figure 7B:
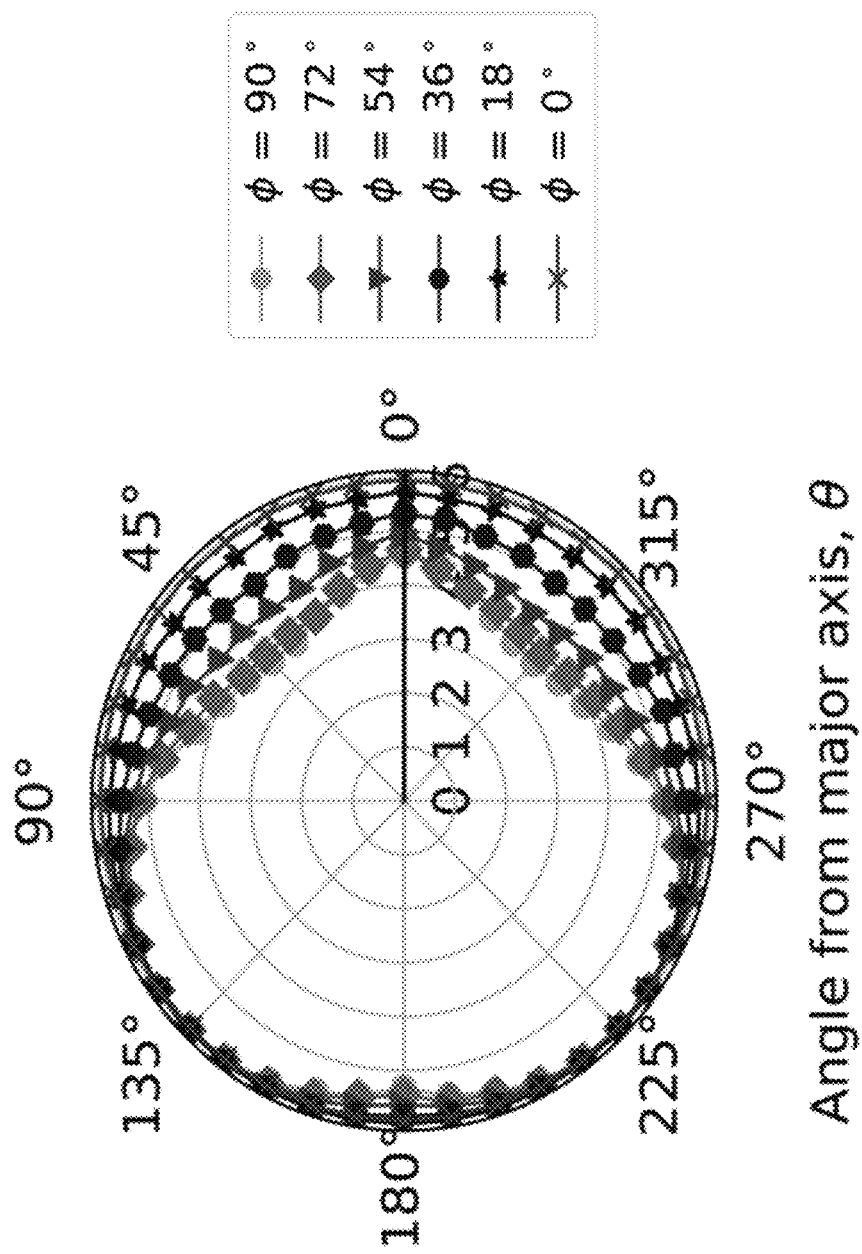
Figure 8A:
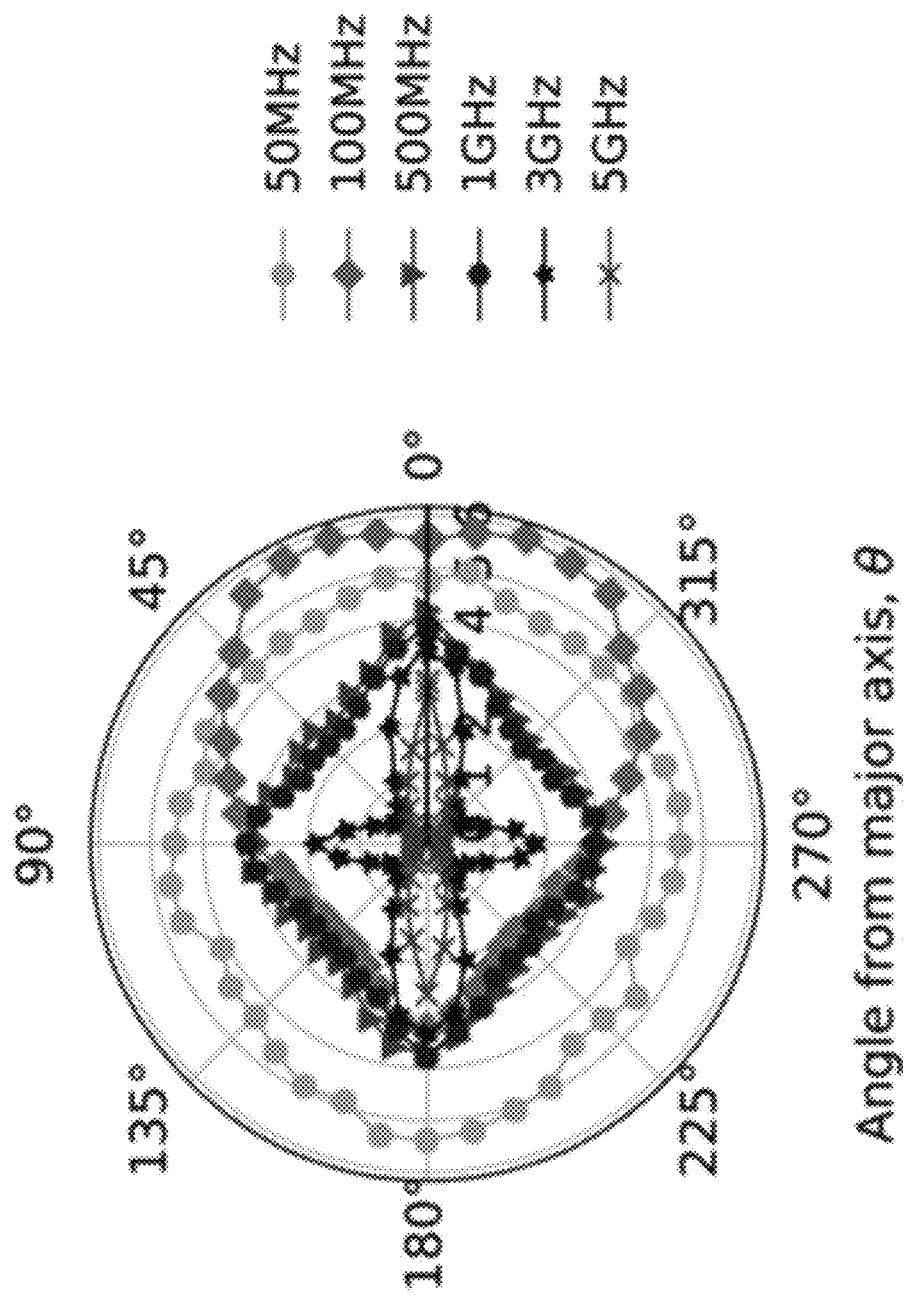
Figure 8B:
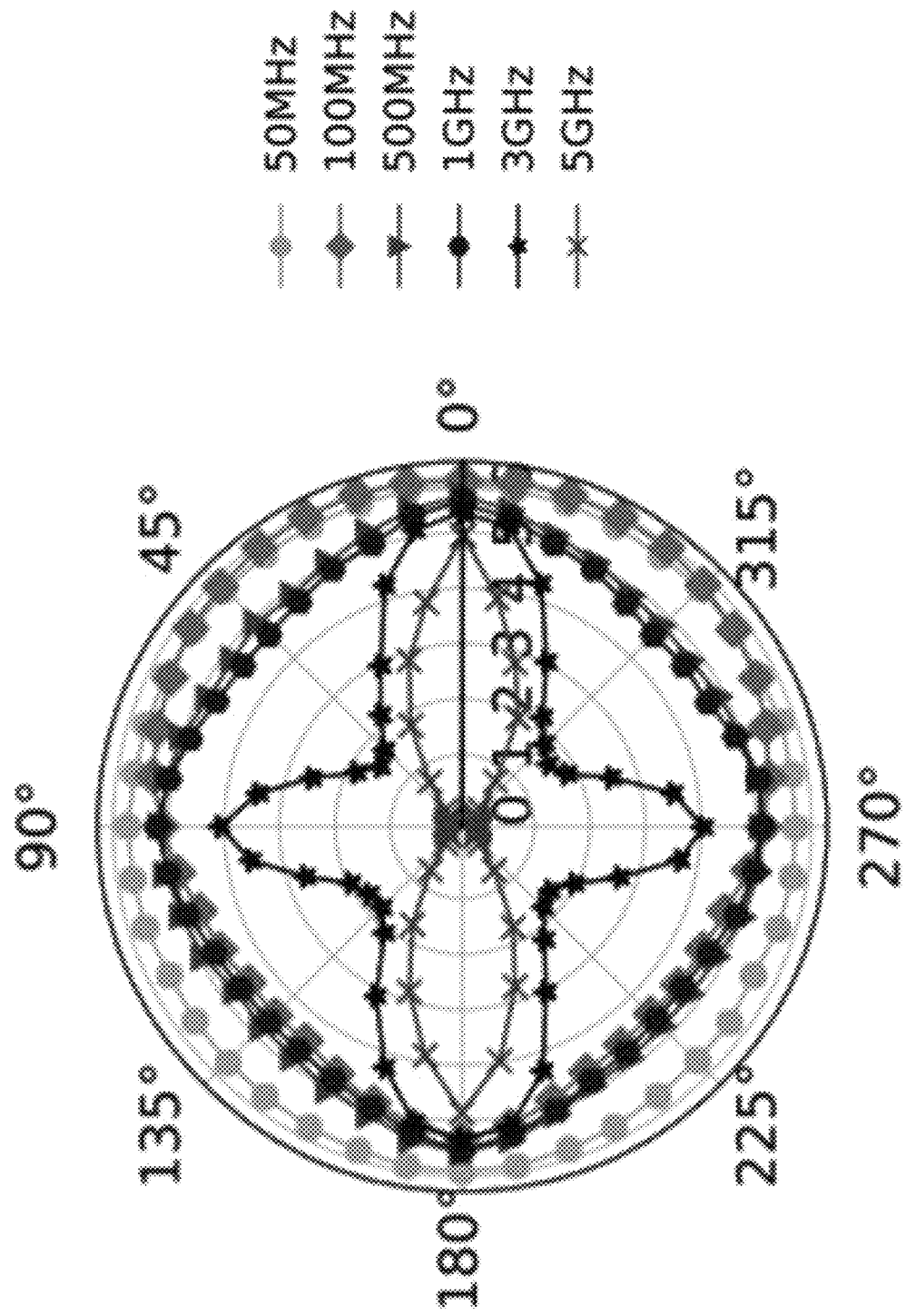

changes at a linear rate of $$-0.4 \frac{\%}{°K},$$

in accordance with some embodiments;

FIGS. 6C, 6D, and 6E are graphs of the effect of a constant external magnetic field (fixed direction and varying magnitude) for a direction parallel to the fixed layer magnetization, a direction in-plane and perpendicular to the fixed layer magnetization, and a direction perpendicular to the layer's plane, in accordance with some embodiments;

FIG. 6F is a key for the graphs presented in FIGS. 6A, 6B, 6C, 6D, and 6E;

FIGS. 7A and 7B are graphs of the effect of a constant external field in different angles and fixed magnitude of $$10 \, k\frac{A}{m}$$

on the entropy of a 6-bit TRNG for the min-entropy and the Shannon entropy, respectively, wherein ϕ is the angle of the field from the axis perpendicular to the MTJ plane, θ is the in-plane angle from the magnetization of the fixed layer;

FIGS. 8A and 8B are graphs of the effect of an alternating external field on multiple in-plane directions and fixed magnitude of $$10 \, k\frac{A}{m}$$

on a 6-bit TRNG, in accordance with some embodiments; and

Figure 9:
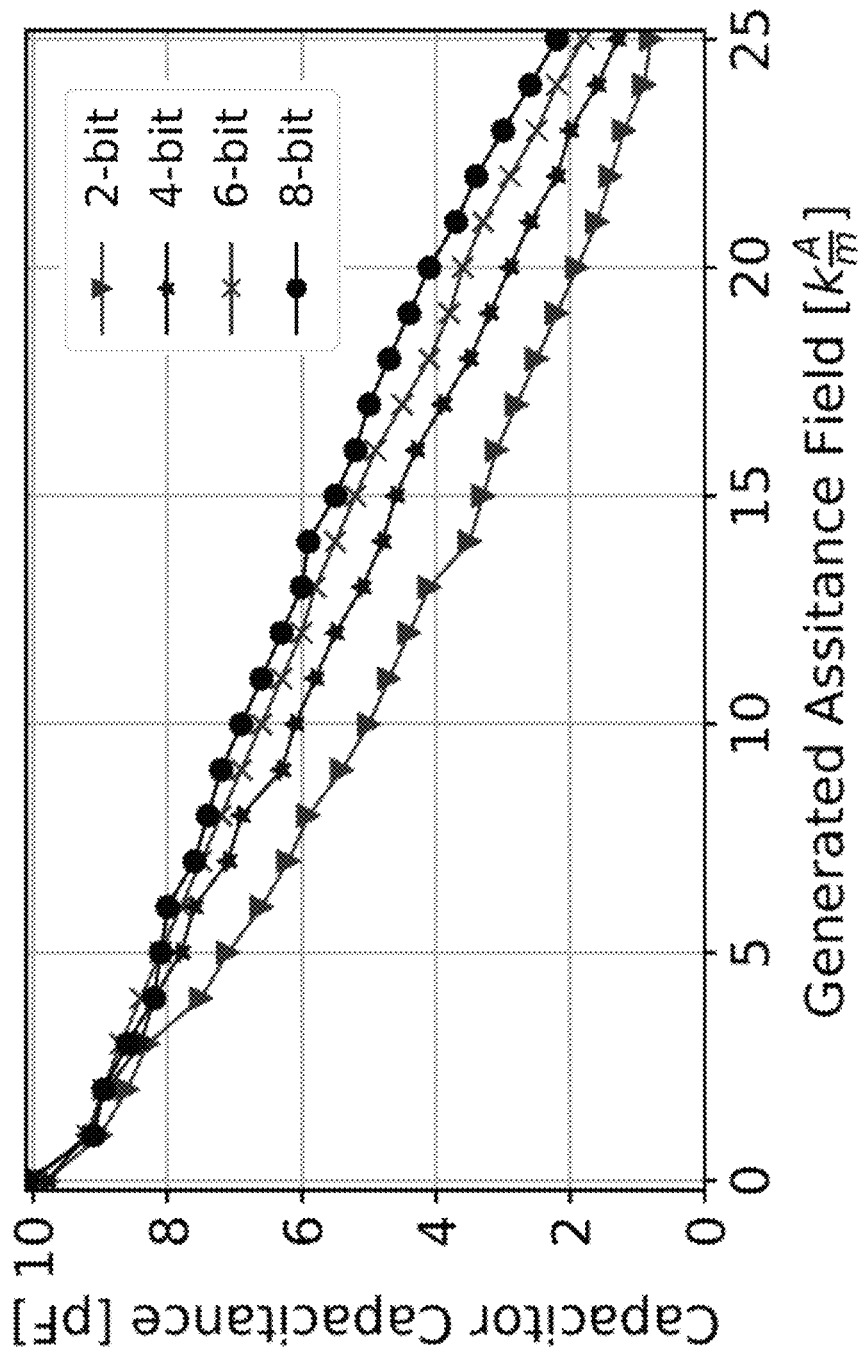

FIG. 9 is a graph of the capacitor capacitance as a function of a generated assistance magnetic field while preserving the entropy.

DETAILED DESCRIPTION

Disclosed herein are a method and system for true random number generation (TRNG) using the spin torque transfer (STT) effect of magnetic tunnel junctions (MTJs). In some embodiments, the present invention is based, at least in part, on random switching of MTJs in an array from an initial high-resistance state to a low resistance state, given a specified electrical energy amount that is discharged from an electrical energy source connected in parallel to the array of MTJs.

In some embodiments, the specified amount of electrical energy is configured to only cause the switching of a known number of MTJs within the array. In some embodiments, the subset of MTJs within the array that change from an initial high resistance state to a low resistance state are distributed randomly within the overall number of MTJs in the array, thereby generating a new random pattern for each discharging of the electrical energy source.

In some embodiments, the random pattern thus generated may be used to create a random number comprising n bits, wherein the random number is created by assigning, e.g., logical '1s' and '0s' to each MTJ in the array, based on a resistance state of each MTJ upon completion of the discharging stage.

Current TNRGs may use CMOS logic, such as ring oscillators or metastable latches, as their source for randomness. However, emerging technologies offer new and interesting alternatives with smaller physical footprints and lower power consumption, when compared to transistors. Such smaller footprint and low power TRNGs may be usable in the context of small or low-power electronic devices (e.g., Internet-of-Things devices and mobile devices). One such technology is the Spin Transfer Torque Magnetic Tunnel Junction (STT-MTJ). As an emerging memory technology, STT-MTJ (or STT-MRAM) has relatively low operating energy and relatively small physical size, and its switching time stochasticity has been established empirically.

However, known STT-MTJ based TRNGs require a strict time measurement to achieve high randomness, wherein optimum randomness must be determined at a precise point in time.

In contrast, in some embodiments, the present application provides for an asynchronous TRNG based on discharging a capacitor having a known initial amount of electrical energy through several STT-MTJ devices connected in parallel. The process ends when the capacitor is sufficiently discharged, and the generated random number is extracted from the final state of the STT-MTJ devices.

Because the capacitor discharge time can be known from its initial charge and the number of MTJs in the array, the random number need not be extracted at a precise point in time, and can be extracted at any time after the completion of the discharge stage. Therefore, the present design can be decoupled form a clock signal and be embedded in low-frequency (i.e., low-power) devices without loss of randomness.

As further detailed below, to evaluate the proposed design, numerical simulations of the stochastic physical model of the STT-MTJ were performed. The randomness of the proposed design and the effect of internal and external influences were measured, including the robustness of the design to process variation. Possible attack venues are discussed, and mitigation options are presented.

In some embodiments of the present invention, there is provided an STT-MTJ-based TRNG system comprising n MTJs that are connected in parallel to an electrical energy source. In some embodiments, the energy source is charged with a specified amount of electrical energy. In some embodiments, prior to discharging of the energy source, the state of each of then MTJs is set to a high resistance state. In some embodiments, and as described in greater detail elsewhere herein, the high resistance state of one or more of the MTJs is an Anti-Parallel (AP) state wherein a free layer and a fixed layer of the MTJ are anti-parallel.

In some embodiments, the electrical energy source is configured to discharge a specified amount of electrical energy, which is transferred, at least in part, to the MTJs. In some embodiments, the electrical energy source is maintained disconnected from the MTJs prior to discharging the specified amount of electrical energy. In some embodiments, a switch, such as a transistor, switches the electrical energy source from the disconnected state to a connected state, in which the electrical energy source begins discharging through the MTJs.

In some embodiments, the specified amount of electrical energy discharged from the electrical energy source is configured to switch only a random subset of the n MTJs to a low resistance state. In some embodiments, the electrical energy source is a capacitor, and the specified energy amount is defined by an initial voltage of the capacitor.

In some embodiments, the current that discharges through the MTJs varies during the discharging due to changes in resistance of the MTJs. The current flowing into each of the MTJs contributes to a change of resistance of each of the MTJs due to a spin-torque transfer (STT) effect. Therefore, the change of the resistance within each MTJ varies and is dependent, at least in part, on one or more of the specified amount of electrical energy, the current flowing through each of the MTJs, and the resistance of each of the other MTJs in the array.

In some embodiments, the electrical energy source being coupled in parallel to the MTJs is in that the specified energy amount can distribute evenly between a set of MTJs in identical resistance states. Therefore, for a set of n MTJs through which a current is flown, the variance between the spin torque transfer in each of the MTJs causes a variance in the resistance of each of the MTJs in relation to each other. A variance of the resistance changes the distribution of the current flown through each of the MTJs, which causes continuously increases the variance in resistance between the n MTJs. This causes a random distribution of the specified amount of electrical energy throughout the MTJs while the resistance of a random subset of the n MTJs lowers and the subset is switched to a low resistance state.

A potential advantage of the present invention is, therefore, in that it provides for a TRNG system that is relatively small in size, has low energy consumption requirements, and can operate independent of a clock signal. As such, a TRNG system of the present invention may be implemented in the context of small and/or mobile devices, to enhance secure communication in such devices.

In some embodiments, and as described in greater detail elsewhere herein, the low resistance state of the subset of MTJs is a Parallel (P) state wherein a free layer and a fixed layer of the MTJ are parallel.

In some embodiments, the specified energy amount required to be charged in the electrical energy source may be determined based, at least in part, on the total number of MTJs in the array and a desired number of MTJs out of the array to be switched to a low resistance state.

In some embodiments, a discharge duration of an MTJ array of the present disclosure may be calculated based, at least in part, on the specified energy amount contained in the electrical energy source and the total number of MTJs in the array. In some embodiments, a resistance state of the MTJs can be determined upon expiration of the known discharge duration. Therefore, a TRNG process of the present invention is self-timed.

There is further provided, in an embodiment, a method for generating a true random number. In some embodiments, the method comprises providing an electrical energy source with a specified amount of electrical energy. In some embodiments, the method comprises connecting n MTJs in parallel to the electrical energy source, wherein each of the MTJs is at a high resistance initial state. In some embodiments, the method comprises discharging the specified energy amount through said MTJs, thereby causing a random subset of the MTJs to switch to a lower resistance state. In some embodiments, the method comprises determining a post-discharging resistance state of each of the MTJs.

In some embodiments, the determination is performed by, e.g., applying a small current through each of the MTJs and using a current sensor, e.g., a sense amplifier, to determine the state of each of the MTJs. In some embodiments, the method comprises determining the final magnetic state following a complete discharge of the specified energy from the electrical energy source.

In some embodiments, the method comprises assigning, e.g., a logical '1' to each MTJ in the subset, and a logical '0' to all other MTJs. In some embodiments, the method comprises arranging the 1s and the 0s into an n-bit word, to generate a true random n-bit word. In some embodiments, each of the logical 0s and 1s corresponds, respectively, to a resistance of the MTJ.

Figure 1:
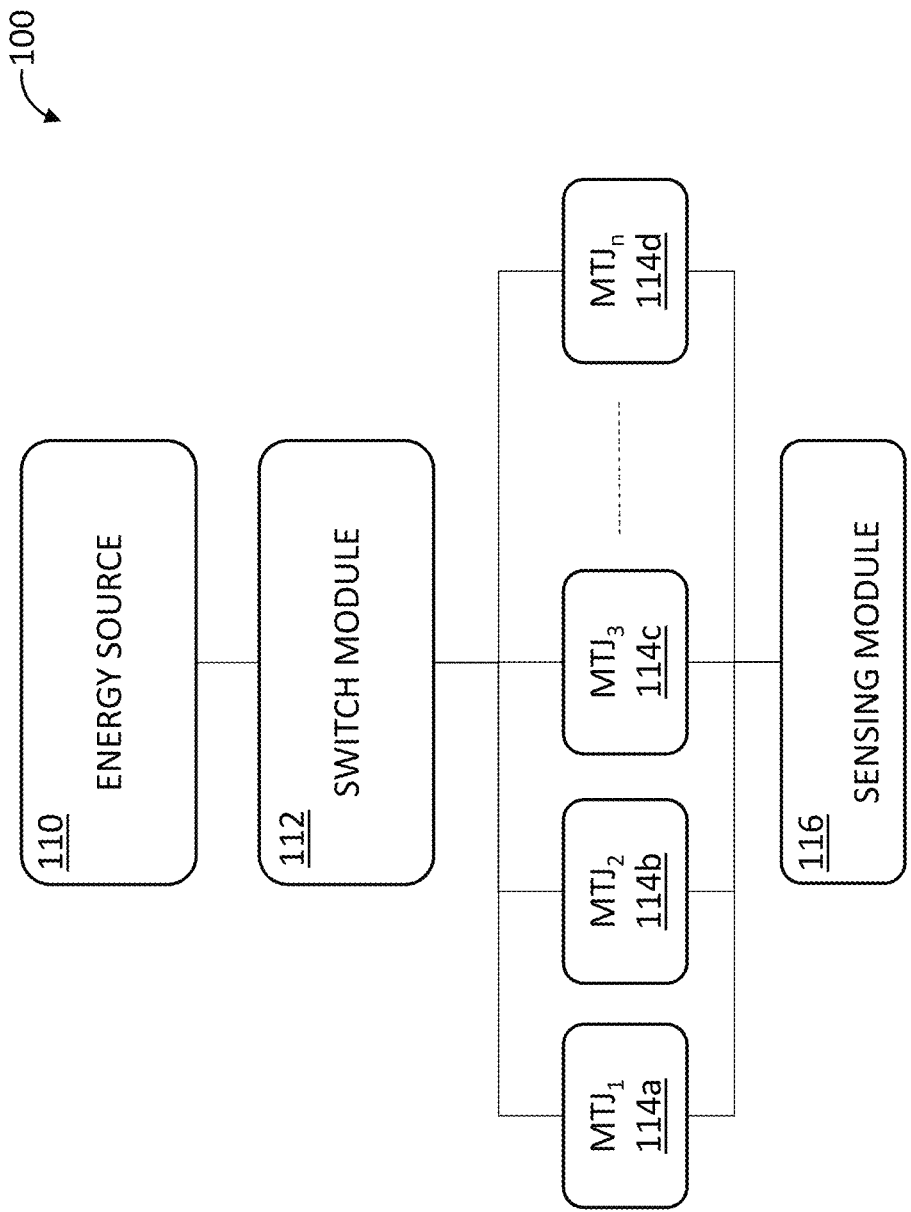
FIG. 1 is a block diagram of an exemplary system, according to an embodiment.

Reference is made to FIG. 1, which is a block diagram of an exemplary system 100 for generating a true random number, according to an embodiment.

In some embodiments, the system 100 comprises a switch module 112 configured to control at least one of an energy source module 110 and n MTJs 114a/114b/114c/114d (hereinafter referred to as n MTJs 114). In some embodiments, the switch module 112 comprises an 'on' mode in which the energy source module 110 is connected to the n MTJs 114, and an 'off' mode in which the energy source module 110 and n MTJs 114 are disconnected. In some embodiments, the system 100 comprises a sensing module 116 configured to determine the state of each of the n MTJs 114. In some embodiments, sensing module 116 is an array of sense amplifiers.

System 100 as described herein is only an exemplary embodiment of the present invention, and in practice may have more or fewer components than shown, may combine two or more of the components, or a may have a different configuration or arrangement of the components. The various components of system 100 may be implemented in hardware, software or a combination of both hardware and software. In various embodiments, system 100 may comprise one or more dedicated hardware devices, or may form an addition to or extension of an existing device.

True Random Number Generators

RNGs are divided into two main groups, Pseudo-Random Number Generators (PRNGs) and True Random Number Generators (TRNGs). PRNGs are deterministic algorithms that only appear to generate a random sequence of numbers. A cryptographic key generated by a PRNG might compromise the encryption since the PRNG outputs are inherently connected, although some PRNGs are considered to be sufficiently secure for cryptographic use. TRNGs are designed to extract a random behavior of some physically random process, resulting in true randomness that can be explained according to some physical laws. The output of a TRNG can only be predicted according to the physical process probability distribution, even if all the information about the system (register values, voltage levels, etc.) is known prior to the TRNG operation.

CMOS TRNGs often use ring oscillators or metastable latches to generate random numbers. A ring oscillator (RO) is a chain with an odd number of NOT gates, where the output of the last NOT gate is the input of the first NOT gate, resulting in a ring of gates. Since the number of NOT gates is odd, all the outputs of the NOT gates oscillate between logic high and logic low. However, due to noise in the transistors, the rise and fall times of the gates are randomly changed, resulting in frequency variation of the oscillation. RO based TRNGs use this frequency variation as the source of randomness: for example, they might compare several ROs or measure the time until the occurrence of a RO-related event. TRNGs based on metastable latches force a latch into an unstable equilibrium state and then release it. The stable state the latch will end in depends on random noise and therefore a random number is generated.

The quality of the randomness of a TRNG can be measured by its output properties, which are ideally independent and uniformly distributed. In practice, this need not be the case for cryptographic use, since the dependencies and nonuniform distribution can be compensated for by post-processing the output. Such post-processing methods are referred to as randomness extractors. However, the closer to independent and uniformly distributed the TRNG output is, the simpler the extractor can be. Even if the output is uniform under regular operation, randomness extractors are still commonly used to compensate for real-world effects (e.g., process variations, wear-out, and interference) that might reduce the randomness of the TRNG output.

Other important properties of a TRNG include robustness to process and environmental variations and a high generating rate. An adversary might change environmental parameters (e.g., electromagnetic field, temperature) to interfere with the operation of the TRNG and reduce its randomness. To guarantee that a TRNG is secure, it is critical to identify the underlying random physical process and the factors affecting it and test the TRNG under these factors. Additionally, to ensure correct operation, statistical tests, referred to as online tests, are often performed on the TRNG output during run-time, which means that they need to be lightly implemented, making them less thorough than the statistical tests performed at design time.

New emerging technologies, such as the STT-MTJ, show small area and low operation energy compared to transistors. Additionally, they exhibit ample stochasticity in their operation, making them interesting candidates as the randomness source for new TRNG designs.

STT-MTJ Devices

Figure 2A:
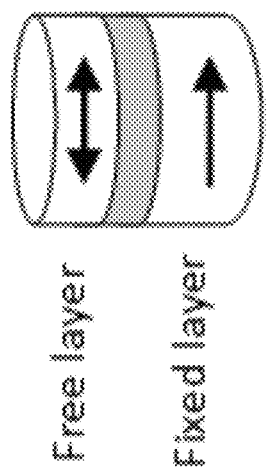
FIGS. 2A, 2B, and 2C are schematic simplified illustrations of magnetic tunnel junctions and operation thereof, at a P state and an AP state.
Figure 2B:
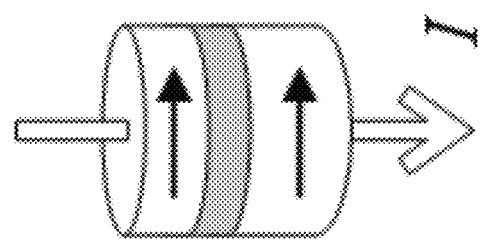
Figure 2C:
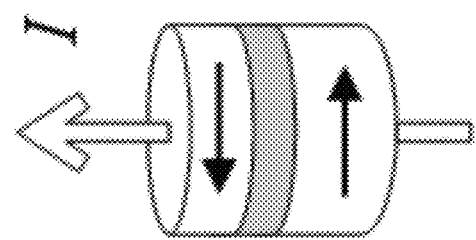

Reference is made to FIGS. 2A, 2B, and 2C, which are schematic simplified illustrations of magnetic tunnel junctions and the operation thereof, at a parallel (P) state and an anti-parallel (AP) state. FIGS. 2A, 2B and 2C show an in-plane STT-MTJ device and its operation showing an STT-MTJ device structure with the free layer (upper), the tunnel barrier layer (middle), and the fixed layer (bottom). FIG. 2B shows an MTJ at a P state, and FIG. 2C shows an MTJ at an AP state.

A spin transfer torque (STT) magnetic tunnel junction (MTJ) is a device composed of two ferromagnetic layers with a tunnel barrier layer between them. One ferromagnetic layer, the fixed layer, has a fixed magnetization direction. The other ferromagnetic layer, the free layer, can switch its magnetization direction. In the present disclosure, in-plane MTJs are used, where the magnetization direction of the ferromagnetic layers is in the plane of the layers. FIG. 1A illustrates the MTJ structure. The direction of the free layer magnetization can be changed by a current through the device, and it has two stable states, parallel (P, FIG. 1B) or anti-parallel (AP, FIG. 1C) to the direction of the fixed layer. The direction of the current determines the change in the magnetization direction. Other states (i.e., other directions of the free layer magnetization) are unstable.

The spin-transfer torque mechanism enables the switching of orientation of the free layer magnetization. The electrons passing through a ferromagnetic layer tend to align their magnetic moment in the direction of the magnetization of the layer. Thus, electrons that pass through the fixed layer first are aligned with its magnetization direction. When these electrons reach the free layer, its magnetization direction shifts towards the P state due to magnetic moment conservation (FIG. 1(b)). In the other current direction, electrons are reflected with magnetic moment direction opposite to that of the fixed layer and change the free layer to the AP state (FIG. 1(c)). However, a damping process pulls the free layer magnetization to the closest stable state, requiring a sufficiently strong current for adequate time to enable a switch between the stable states.

The switching process between the P and AP states is random due to the thermal fluctuations in the ferromagnetic layers. Although the current through the MTJ pushes the magnetization of the free layer to a certain stable state (through unstable intermediate states), thermal fluctuations will make the path to that state random, resulting in a random switching time. Even if no current is applied, the state of the STT-MTJ fluctuates constantly since the thermal fluctuations occur regardless of the existence of the current.

The state of the MTJ also determines its resistance, where the P state resistance is marked as $R_{on}$, the AP state is marked as $R_{off}$, and $R_{on} < R_{off}$. The resistance of the MTJ, when it is in a state other than P or AP, is between $R_{on}$ and $R_{off}$ and its exact value depends on the state. To determine the state of the MTJ, a low voltage can be applied across it (sufficiently low not to incur a switch), the current can be measured, the resistance of the MTJ can be extracted (by Ohm's law), and the state of the MTJ can be inferred.

To model the operation of the entire STT-MTJ, the magnetization of the free layer is usually approximated to a single domain. The phenomenological Landau-Lifshitz-Gilbert (LLG) equation (T. L. Gilbert, "A phenomenological theory of damping in ferromagnetic materials," IEEE Trans. Magn., vol. 40, no. 6, pp. 3443-3449, November 2004.), with the addition of a stochastic term for the thermal fluctuations (J. L. Garcia-Palacios and F. J. Làzaro, "Langevin-dynamics study of the dynamical properties of small magnetic particles," Phys. Rev. B, Condens. Matter, vol. 58, pp. 14937-14958, December 1998.) and Slonczewski's STT term (J. C. Slonczewski, "Current-driven excitation of magnetic multilayers," J. Magn. Magn. Mater., vol. 159, nos. 1-2, pp. L1-L7,1996), can accurately describe the dynamics of the magnetization of the free layer. For current pulses with low or high current magnitudes, approximations and models for the distribution of the switching time exist. For current pulses with intermediate current magnitudes, approximations for the switching time distribution and other models are also available (A. F. Vincent, N. Locatelli, J. O. Klein, W. S. Zhao, S. Galdin-Retailleau, and D. Querlioz, "Analytical macrospin modeling of the stochastic switching time of spin-transfer torque devices," IEEE Trans. Electron Devices, vol. 62, no. 1, pp. 164-170, January 2015, and Y. Zhang, "Compact modeling of perpendicular-anisotropy CoFeB/MgO magnetic tunnel junctions," IEEE Trans. Electron Devices, vol. 59, no. 3, pp. 819-826, March 2012.). However, there is no model for the switching distribution in the intermediate current region for non-pulse waveforms. In the last case, the LLG equation has to be solved numerically.

Previously Proposed STT-MTJ Based TRNGs

Emerging technologies, such as memristors, have been proposed for TRNGs that operate by applying a current pulse through the devices to randomly switch them with approximately 50% probability. The generated random number in these TRNGs is the state of the memristors at the end of operation. Similarly, TRNGs based on STT-MTJ have been proposed. In these designs, the current pulse is controlled by a feedback circuit in order to be robust to process variation and environmental changes. However, only Qu et al. (Y. Qu, J. Han, B. F. Cockburn, W. Pedrycz, Y. Zhang, and W. Zhao, "A true random number generator based on parallel STT-MTJs," in Proc. Design, Automat. Test Eur. Conf. Exhib. (DATE), March 2017, pp. 606-609.) have analyzed the effects of process variation, and proposed to use several MTJ devices in parallel to mitigate those effects.

In Y. Qu, "Variation-resilient true random number generators based on multiple STT-MTJs," IEEE Trans. Nanotechnol., vol. 17, no. 6, pp. 1270-1281, November 2018., Qu et al. proposed a differential approach, where two STT-MTJs are connected in series and in reverse orientation. A current pulse is driven through both of the MTJs simultaneously and a dedicated mechanism terminates the pulse when one of the MTJs is switched. The output bit is determined according to the end state of both MTJs. This design was shown to be robust to process variation, operating voltage, and temperature, due to the symmetry of the MTJs.

All of the aforementioned TRNGs use controlled current pulses to switch the MTJs. To measure the duration of the current pulses, a clock with a period smaller than or equal to the pulse duration is needed. Additionally, the quality of the randomness will be influenced by the ability of the clock signal to accurately measure the pulse duration, further binding and complicating the system. Therefore, these TRNGs are incompatible with systems that have insufficient clock frequency or accuracy, such as low power systems with low frequency clock.

Lee et al. (H. Lee, F. Ebrahimi, P. K. Amiri, and K. L. Wang, "Design of high-throughput and low-power true random number generator utilizing perpendicularly magnetized voltage-controlled magnetic tunnel junction," AIP Adv., vol. 7, no. 5, 2017, Art. no. 055934.) proposed to reduce the energy barrier between the P and AP of the MTJ to enable faster switching with reduced energy. This was achieved by using specially designed MTJ devices. Their proposed TRNG design uses multiple MTJs (to reduce the effect of process variation) with low energy barriers, which were set to an unstable state and released, letting the MTJs settle randomly to one of the stable states. Vodenicarevic et al. (D. Vodenicarevic, "Low-energy truly random number generation with superparamagnetic tunnel junctions for unconventional computing," Phys. Rev. Appl., vol. 8, November 2017, Art. no. 054045) proposed a TRNG based on a similar approach, where the STT-MTJ's energy barrier between the P and AP states is sufficiently low to enable spontaneous switching in a reasonable time, without the aid of external stimuli and solely by thermal fluctuations. These two approaches require the use of specially designed MTJs due to the reduced energy barrier (Lee, 2017), and, despite the advantages of reduced latency and energy, this approach makes the design more vulnerable to external magnetic fields, and thus to attacks.

Ghosh (S. Ghosh, "Spintronics and security: Prospects, vulnerabilities, attack models, and preventions," Proc. IEEE, vol. 104, no. 10, pp. 1864-1893, October 2016.) comprehensively analyzed spintronics in security applications and showed that MTJ-based security circuits are sensitive to the effects of an external magnetic field. Hence, it is essential to consider this effect when designing an MTJ based TRNG, to determine the security of such a design and the effects of nearby circuits. However, none of the aforementioned STT-MTJ based TRNGs that rely on a current pulse were designed to account for the effects of an external magnetic field and the associated attacks. The authors of Lee [2017] and Vodenicarevic [2017] only briefly consider the effects of an external magnetic field and their design relies on a special MTJ device that is more vulnerable to attacks. In the present disclosure, the standard MTJ devices were chosen due to being easier to fabricate in a standard process and having better robustness against attacks. A comprehensive evaluation of the effects of an external magnetic field on the proposed TRNG design is provided.

Proposed TRNG Structure and Operation

Reference is made to FIG. 2A, which shows a schematic simplified illustration of the proposed TRNG consists of an N parallel connected MTJ-modules and a capacitor and to FIG. 2B, which shows a schematic simplified illustration of an MTJ module.

The proposed TRNG generates N-bit numbers and is composed of a capacitor, N STT-MTJ devices, N sense amplifiers, and transistors that serve as switches, as shown in FIGS. 2A and 2B.

The TRNG operation consists of one or more of the disclosed three steps, each taking a fixed amount of time. The first step, the Reset step, charges the capacitor C to the $V_{init}$ voltage (using transistors N1 and P1) and applies a current through the MTJ devices (using transistors N4 and P4), switching them all to the AP state. The second step, the Enable step, connects C in parallel to all the MTJ devices (using transistors N2, N3, and P2). This discharges C through the MTJ devices, enabling them to switch to the P state with some probability. During the Enable step, the resistance of an MTJ drops if it is switched, making the capacitor discharge faster. This lowers but does not eliminate the switching probability of the other MTJs. The third step, the Read step, applies a small current through the MTJ devices (using transistor P3), and the sense amplifiers determine the state of each. The AP/P states are interpreted as '0'/'1' respectively. Overall, the TRNG outputs an N-bit word.

The proposed TRNG relies on the stochastic switching time of the MTJ as its randomness source. Unlike previously proposed TRNGs, the randomness extraction operation in the Enable step is asynchronous and does not depend on a strict time measurement. The capacitor is sufficiently discharged during the Enable step to ensure a low probability for further switching until the end of the Read step. Hence, the randomness of the output does not change if the duration of the Enable step is longer than a certain lower bound. Thus, accurate measurement of the Enable step duration is not required. Note that although the Enable step is done asynchronously, the TRNG still uses a clock signal since a time measurement is still needed to transition between the operation steps.

Measure for Randomness

Determining whether a sequence of numbers is random is considered difficult. To try and overcome this problem, standard statistical test suites, such as the NIST SP 800-22 (A. Rukhin, J. Soto, J. Nechvatal, M. Smid, and E. Barker, "A statistical test suite for random and pseudorandom number generators for cryptographic applications," NIST, Gaithersburg, MA, USA, Tech. Rep. SP 800-22, Revision 1a, April 2010.), are usually used to inspect for random properties. However, the proposed TRNG is evaluated using a simulation, which generates the TRNG outputs (N-bit words) in an i.i.d. (independent and identically distributed) manner. Each output is generated independently by numerically solving the stochastic differential equation system of the TRNG, which uses a different sequence of computer-generated random thermal noise for each TRNG output word. Hence, the simulation is designed such that there are no dependencies between bits from different TRNG outputs, but only the dependencies between bits in the same output word, reducing the dependency checks to within an output word.

To measure the dependencies between bits in the same output word, two measures were used: the Shannon entropy and the min-entropy of the output words. Entropy quantifies the probability in the outcome of the experiment. The higher the entropy, the lower probability in the experiment, i.e., the experiment is more random. For an i.i.d. source with values from a finite set $\chi$ with probability distribution function p: $\chi \rightarrow [0,1]$, the Shannon entropy per word is $-\rho_{x \in \chi} p(x) \log_2 p(x)$ (with the definition that $0 \cdot \log_2 0 = 0$) and the min-entropy per word is $\min_{x \in \chi}(-\log_2 p(x))$. Both entropies are measured in bits. If the number of elements in the finite set $\chi$ is m, then both the Shannon and min entropies get a value in the range $[0, \log_2 m]$, where 0 entropy is achieved on the deterministic distribution and the $\log_2 m$ entropy is achieved on the uniform distribution. Taking $\chi$ to be the set of N-bit words results in $\log_2 m = N$. Hence, the maximum entropy for an i.i.d. N-bit TRNG is N.

When there are dependencies between bits in the TRNG output, some output words will be more likely than others and the distribution of a single TRNG output word will deviate from the uniform distribution, resulting in a lower entropy than the maximum. Stronger dependency increases the deviation from the uniform distribution and the lowers the entropy. Hence, entropy is a measure for the dependencies in a single TRNG output word and an entropy close to maximum means low dependencies.

The min-entropy is a lower bound to the Shannon entropy (with equality achieved on the uniform and deterministic distributions) and it is the lowest amount of randomness a single sample of a random variable can give. Randomness extractors are sometimes designed to extract an output for every input, so the correct measure here is the min-entropy of their source. The Shannon entropy is the expected randomness from a random variable. For an i.i.d. source, the Shannon entropy plays an important role in bounding the number of uniformly distributed bits that can be extracted from n samples. Hence, the Shannon entropy gives us a notion of how many samples are required to extract a certain degree of randomness, while the min-entropy gives us the worst-case randomness of a single sample.

Simulation Methodology

The TRNG was evaluated by Monte-Carlo simulations for the Enable step for different topologies, each with a different number of MTJ devices (different N). The simulation numerically solves the differential equation system of the MTJs (stochastic LLG equations) and the capacitor. The LLG equations are used since a non-pulse current waveform is passed through the MTJ devices. The transistors N2, N3, and P2 were modeled by a constant resistance. The equations were solved using a standard midpoint scheme assuming no external magnetic field (unless otherwise stated) and the stochastic term was interpreted in the sense of Stratonovich.

An analytic expression for the TRNG output distribution was not obtained. Each iteration of the Monte-Carlo simulation produces the TRNG output binary word. For each measurement of entropy, 2000 iterations were conducted. The probability of each TRNG output was evaluated as its frequency of appearance. However, when the parameters of the simulated MTJs were identical (i.e., with no device-to-device variations), the probability was evaluated as the frequency of the corresponding Hamming weight divided by the number of outputs with the same Hamming weight (From symmetry, outputs with the same Hamming weight have the same probability), thus increasing the accuracy. Note that each iteration of the Monte-Carlo simulation produces a single N-bit output of the TRNG, meaning that the simulation produces the probability of a single output of the TRNG.

When this simulation model is used to extract the entropy of the TRNG, the TRNG is assumed to be an i.i.d. source, since the model does not include the correlation between consecutive runs of the TRNG. This assumption is justified since the MTJs are set to an AP state prior to the Enable step, regardless of the output of the last run. Furthermore, thermal fluctuations occur constantly; hence, the exact position of the magnetization (around the AP state) at the beginning of the Enable step is itself random. This results in a fresh start in every run. Nevertheless, consecutive runs will be correlated in a real-world TRNG. Some correlation will be caused by changes in the operation parameters but not by true causality between samples.

If, for example, during the sampling of the TRNG, a nearby circuit will periodically work with cycle time T, the magnetic field on the MTJs will change with the same period. As a result, samples with time T between them will show correlation just because they have the same distribution, not because they have true causality. Similar effects can come in the form of temperature, voltage, etc. The STT-MTJ devices are modeled as device C from Vincent [2015], a standard in-plane STT-MTJ that can be used for memory design and has the lowest switching current in Vincent [2015]. The circuit parameters are listed in Table 1.

TABLE 1

Simulated Circuit Parameters. $R_{N2, N3, P2}$ is the modeled total effective resistance of transistors N2, N3, P2.

| Feature | Value |
|---|---|
| NFET operation gate voltage | 1.5 V |
| PFET operation gate voltage | 0 V |
| $R_{N2, N3, P2}$, 2-bit TRNG | 4450 Ω |
| $R_{N2, N3, P2}$, 4-bit TRNG | 3440 Ω |
| $R_{N2, N3, P2}$, 6-bit TRNG | 2640 Ω |
| $R_{N2, N3, P2}$, 8-bit TRNG | 1960 Ω |
| $R_{on}$ | 1000 Ω |
| $R_{off}$ | 2500 Ω |
| $V_{init}$ | 0.8 V |
| $T_{enable}$ | 10 ns |
| C | 10 pF |
| Temp. | 300 K |

Different values for the modeled effective resistance of transistors N2, N3, and P2 were simulated for each topology, and were chosen to maximize the entropy; results are shown in Table 1. In order to find the size of the transistors and verify the accuracy of the constant resistance model, circuit simulations were performed (with resistors instead of MTJs) in Cadence Virtuoso using a 28 nm GlobalFoundries process. The Virtuoso simulations showed that the transistors transition quickly at the beginning of the Enable step. Since this transition time is faster than the switching time of the MTJs, it can be ignored. During the rest of the Enable step the total resistance of the transistors is approximately constant, verifying that the constant resistance model of the transistors is acceptable for the evaluation of the system design.

Since the resistance of the interconnect is a few ohms per μm while the resistances of the transistors and MTJs are in the order of kΩ, the wire resistance is neglected. The difference in resistance due to difference in wire lengths between the MTJ modules is also in the order of a few ohms and is well within the process variation considerations are described elsewhere herein. Hence, the difference in resistance due to difference in wire lengths between the MTJ modules is neglected as well. Additionally, the parasitic capacitance and leakage currents in the system design were measured. The simulation shows that the parasitic values are several orders of magnitude lower than the non-parasitic values, and hence they are ignored.

The number of MTJ devices in the design, i.e. N, was restricted to 2, 4, 6, and 8 because the larger N is, the shorter the discharge time of the capacitor. Hence, a stronger current should flow through the MTJ devices to maintain the same switching probability, requiring a lower transistor resistance. The lower resistance will shorten the discharge time further, but the resulting switching probability of the MTJs will increase. However, a lower transistor resistance means a larger transistor size. A larger N can improve the performance of the TRNG (see Section 4.4). However, the simulation was restricted to N≤8 since the transistor sizes required for the N=8 topology are considered large (width of a few hundred nano-meters). A larger N can be achieved by considering different system parameters (e.g., higher $V_{init}$, larger capacitor).

Figure 4B:
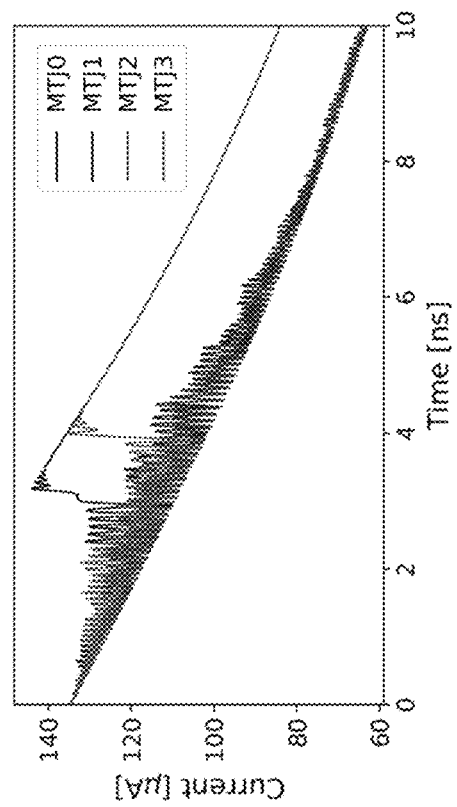
FIG. 4B is an example for a single iteration of the simulation for N=4 for the magnetization direction of the free layer in the dimension of the fixed layer magnetization during the Enable step as a function of time.
Figure 4A:
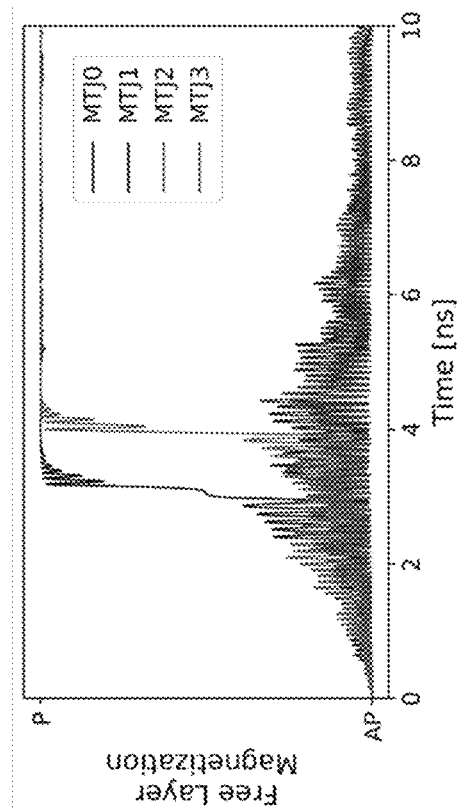
FIG. 4A is an example for a single iteration of the simulation for N=4 for the current through the MTJs during the Enable step as a function of time.

Reference is made to FIG. 4A, which is an example for a single iteration of the simulation for N=4 for the current through the MTJs during the Enable step as a function of time, and to FIG. 4B, which is an example for a single iteration of the simulation for N=4 for the magnetization direction of the free layer in the dimension of the fixed layer magnetization during the Enable step as a function of time. In the example depicted by FIGS. 4A and 4B, MTJ0 and MTJ3 are flipped to the P state, and the TRNG output word will be 1001.

An example for a single iteration of the simulation with N=4 is shown in FIGS. 4A and 4B (N=4 was chosen for clarity). The currents through the MTJs during the simulated Enable step are shown in parallel to the magnetization of the free layer (in a single dimension, the dimension of the fixed layer magnetization). When an MTJ switches to the P state, its resistance drops and the current through it increases. When the current reaches the P state, the current through the MTJ and the magnetization of the free layer remain steady, since the current through the MTJ continues to direct the state to the P state.

The results were compared to CMOS-based TRNGs. Since previously proposed STT-MTJ based TRNGs require a high frequency clock or a modified STT-MTJ device and do not include process variation or external magnetic field influence in their evaluation, comparing the results of the MTJ based TRNGs to those designs is moot.

NIST Statistical Test Suite

The National Institute of Standards and Technology (NIST) SP 800-22 rev.1a Rukhin [2010] test suite is commonly used to evaluate random number generators. The suite is composed of several statistical tests, each operating on a string of bits. The test indicates whether this string of bits is likely to come from a uniform i.i.d. source. To conduct the test suite, a number of bit sequences are retrieved from the generator to be tested (sequences do not share bits between them). Each test is run on all sequences, resulting in a P-value for each sequence on each test. The P-value quantifies the distance between the test result for that sequence and the expected result for a uniform i.i.d. sequence.

A sequence is said to pass a test if the P-value for that sequence and test is above a threshold. Then two scores are given for each test, a success rate and a P-value. The success rate is the proportion of sequences that pass that test, while the P-value is a number between 0 and 1. This number quantifies the distance of the sequences' P-value distribution from the expected P-value distribution of a uniform i.i.d. source for that test. Note that even a perfect source will not produce a perfect success rate and P-value (i.e. 1) for a test, due to statistical deviations. A generator is said to pass a test if the test's success rate and P-value are both above a threshold.

The proposed TRNG does not have a uniform distribution since output words with different Hamming weight have For each topology of the TRNG, 1024 sequences of 1024 bits each (a total of $2^{20}$ bits) were generated for the NIST test suite. The results of the P-value and success rates for the tests with their thresholds are listed in Table 2. To perform all of the tests in the suite, a substantially larger number of bits is needed, which will require an unfeasible amount of time to produce with the TRNG simulation. Therefore, the tests listed in Table 2 are those that can be run with the produced number of bits. All topologies passed all executed tests.

TABLE 2

Results of the NIST test suite Rukhin [2010] for the proposed TRNG for different numbers of bits (N). P-value threshold is .0001 and success rate threshold is 1004/1024 ≈ .980 for testing 1024 sequences. The proposed TRNG passed all the tests.

| Test Name | N = 2 | | N = 4 | | N = 6 | | N = 8 | |
|---|---|---|---|---|---|---|---|---|
| | P value | Succ. Rate | P value | Succ. Rate | P value | Succ. Rate | P value | Succ. Rate |
| Frequency | 0.28 | 0.993 | 0.0079 | 0.992 | 0.69 | 0.992 | 0.54 | 0.985 |
| Block Frequency | 0.73 | 0.995 | 0.43 | 0.990 | 0.53 | 0.985 | 0.20 | 0.988 |
| Runs | 0.038 | 0.990 | 0.22 | 0.988 | 0.068 | 0.983 | 0.25 | 0.992 |
| Longest Run | 0.87 | 0.990 | 0.34 | 0.993 | 0.073 | 0.990 | 0.28 | 0.990 |
| Serial (1) | 0.17 | 0.988 | 0.029 | 0.982 | 0.081 | 0.989 | 0.14 | 0.985 |
| Serial (2) | 0.52 | 0.994 | 0.17 | 0.987 | 0.44 | 0.989 | 0.58 | 0.987 |
| Approximate Entropy | 0.28 | 0.982 | 0.00078 | 0.984 | 0.75 | 0.984 | 0.065 | 0.986 |
| Cusum (1) | 0.026 | 0.990 | 0.0011 | 0.990 | 0.016 | 0.988 | 0.00067 | 0.983 |
| Cusum (2) | 0.16 | 0.992 | 0.0082 | 0.992 | 0.0014 | 0.989 | 0.055 | 0.985 | different probabilities, while output words with the same Hamming weight have the same probability (due to symmetry). Since the design was calibrated for maximum entropy, the words with minimum (all zeros) and maximum (all ones) Hamming weights have the lowest probabilities, while the words with the half zeros and half ones have the highest probability. This results in a bias towards certain bit patterns when a sequence of output words is considered as a sequence of bits.

In some embodiments, the NIST test suite is expected to fail on the proposed TRNG without post-processing. Failing the NIST test suite does not mean that the TRNG is not random; it means only that the TRNG distribution does not appear to be uniformly distributed. Furthermore, non-uniformity does not mean that the TRNG cannot be used for cryptography. It means only that post-processing might be a prerequisite for this use. Regardless, post-processing might be used to compensate for process variation and interference effects.

In order to show that the proposed TRNG is sufficiently random, the TRNG output words are post-processed by a simple and reversible function before evaluation by the test suite. The reversibility of the processing indicates that the new bit sequence has the same information as the original sequence. To define the post-processing, the TRNG output word sequence is denoted by $\{w_1, w_2, w_3, \ldots\}$ and the processed word sequence is denoted by $\{z_1, z_2, z_3, \ldots\}$, each of which are N-bit words. Then, the post-processing is defined as $z_1 = w_1$ and $z_i = w_i \oplus z_{i-1}$ for $i > 1$ ($\oplus$ is the bit-wise XOR operation). The bit sequence is taken as the bits of $\{z_i\}_{i \geq 1}$, starting from $z_1$, in a big-endian fashion. This operation is reversible (since $w_1 = z_1$ and $w_i = z_i \oplus z_{i-1}$ for $i > 1$) and simple to implement (requiring an N-bit register and N XOR gates). Note that this post-processing is not a qualified cryptographic hash function or randomness extractor. It is used solely to demonstrate that the TRNG has sufficient randomness to pass the test in the NIST test suite.

Entropy per Output

Reference is made to FIGS. 5A, 5B, 5C, and 5D, which show graphs of the entropy of the TRNG for different (a) enable step time duration, (b) $V_{init}$, (c) C, and (d) offset in the total effective resistance of transistors N2, N3, P2, in accordance with some embodiments. The entropy of the TRNG for different design, environmental, and process parameters was evaluated.

Design Parameters

The Design parameters include the Enable step duration time, $V_{init}$, C, and the effective modeled resistance of N2, N3, and P2. Simulation results of the entropy for different design parameters are shown in FIGS. 5A, 5B, 5C, and 5D. The design parameters trade-off between the different performance measures of the TRNG (entropy, operation time, area and power) while using the same MTJ devices. An important observation is that the proposed design can, in the ideal case, reach nearly the maximum possible entropy (1-bit entropy per MTJ device).

Figures 5A, 5B:
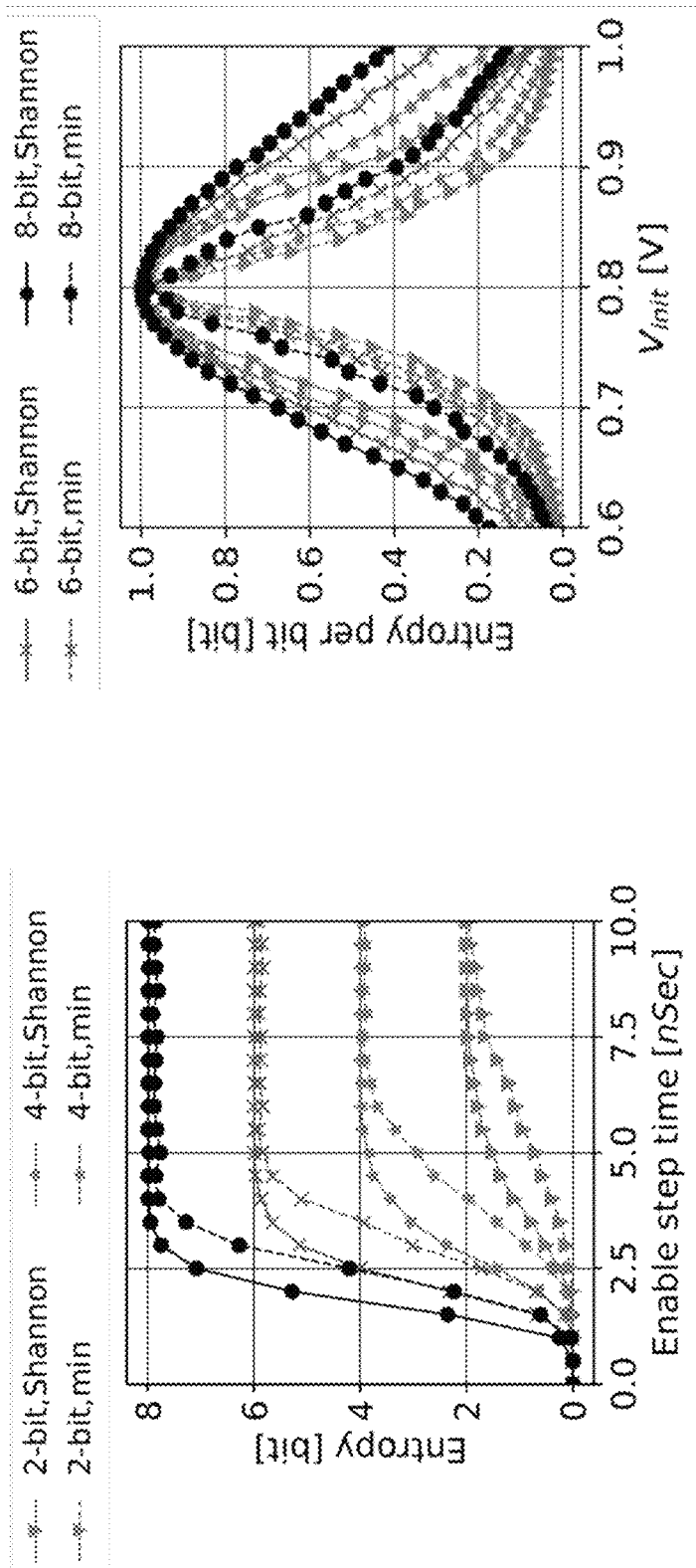
FIGS. 5A, 5B, 5C, and 5D are graphs of the entropy of the TRNG for different (a) enable step time duration, (b) $V_{init}$, (c) C, and (d) offset in the total effective resistance of transistors N2, N3, P2, in accordance with some embodiments.
Figures 5C, 5D:
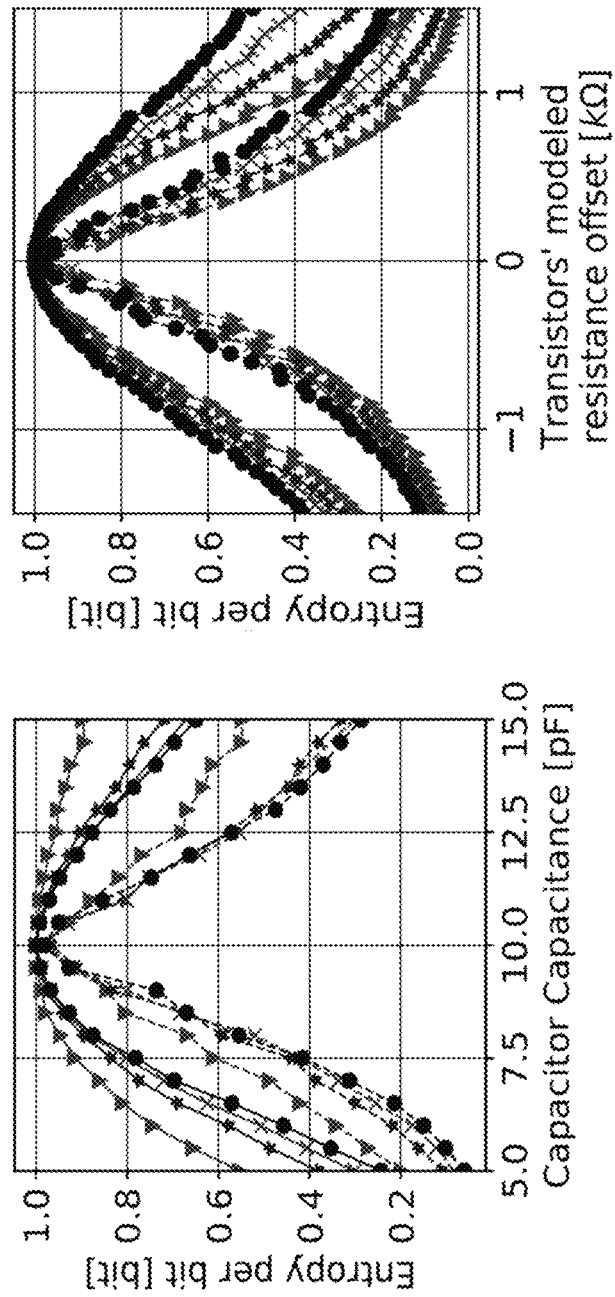

FIG. 5A shows the effect of the Enable step duration. When the duration is sufficiently long, the randomness of the TRNG is maximal. This allows the TRNG to be used in low-frequency devices, where the time measurement has a low resolution.

It is evident that a small change in $V_{init}$, from its designed value of 0.8V, can change the entropy. The value of the initial capacitor voltage affects the duration of the Reset step and the entropy throughput of the TRNG. However, reasonable variations in the capacitance of the capacitor (less than 0.5 pF, or approximately 5%) have little effect on the entropy, since the capacitance is relatively large.

Additionally, modeling the open transistors by a constant resistance is tolerable. Deviations in the range of 250Ω from the designed value do not reduce the entropy much. Using the Cadence Virtuoso simulation, the actual effective resistance of N2, N3, and P2 was verified, and fluctuate well within the range of ±250Ω around the designed value.

Environmental Parameters

Reference is made to FIGS. 6A and 6B, which show graphs of the entropy per bit as a function of temperature for a non-changing MTJ resistance and including a change in MTJ resistance, where $R_{on}$ is constant and $$TMR = \frac{R_{off} - R_{on}}{R_{on}}$$

changes at a linear rate of $$-0.4\frac{\%}{°K},$$

in accordance with some embodiments, and to FIGS. 6C, 6D, and 6E, which show graphs of the effect of a constant external magnetic field (fixed direction and varying magnitude) for a direction parallel to the fixed layer magnetization, a direction in-plane and perpendicular to the fixed layer magnetization, and a direction perpendicular to the layer's plane, in accordance with some embodiments, and to FIG. 6F, which shows a key for the graphs presented in FIGS. 6A, 6B, 6C, 6D, and 6E.

The parameters presented in the graphs of FIGS. 6A, 6B, 6C, 6D, and 6E are external to the TRNG and can be altered by an adversary. The effect of temperature and the external magnetic field on the MTJ devices are considered here, and their influence on the entropy is shown in FIG. 5.

In the LLG equation, the temperature affects only the thermal fluctuations of the MTJ. However, the resistance of the MTJ is temperature dependent. While the resistance of the MTJ in the P state is roughly constant, the resistance of the AP state changes more considerably with the temperature. The $$TMR = \frac{R_{off} - R_{on}}{R_{on}}$$

changes in an approximately linear manner around 300° K, with a rate of $$-0.2\frac{\%}{°K} \text{ to } -0.4\frac{\%}{°K}.$$

according to (V. Drewello, J. Schmalhorst, A. Thomas, and G. Reiss, "Evidence for strong magnon contribution to the TMR temperature dependence in MgO based tunnel junctions," Phys. Rev. B, Condens. Matter, vol. 77, no. 1, January 2008, Art. no. 014440.).

In order to investigate the temperature dependent behavior of the proposed TRNG design, different temperatures were simulated while maintaining $R_{on}$ constant, and changing $R_{off}$ to produce a TMR change with a linear rate $$0\frac{\%}{°K}$$

(i.e., constant TMR) (FIG. 6A and $$-0.4\frac{\%}{°K}$$

(FIG. 6B).

If the TMR rate is $$0\frac{\%}{°K},$$

only the thermal fluctuations are affected by the temperature change. In this case, a degradation in the TRNG entropy is evident when the temperature deviates from 300° K. The switching probability of the MTJs changes with the temperature (as can be seen by the min-entropy in FIG. 6A), but the Shannon-entropy of the TRNG output word remains high in the examined temperature range.

If the TMR rate is $$-0.4\frac{\%}{°K},$$

the entropy of the TRNG is better than in the $$0\frac{\%}{°K}$$

case. When the temperature is lower (higher) than 300° K, the resistance of $R_{off}$ increases (decreases), resulting in a lower (higher) initial current through the MTJs but with a longer (shorter) discharge time for the capacitor. The longer (shorter) discharge time results in a longer (shorter) time for a non-negligible switching probability current, which might negate the reduced (increased) switching probability produced by the thermal fluctuations. These two effects, the thermal fluctuations and the current waveform through the MTJ, interact in a non-trivial way with the entropy due to their different non-linear characteristics.

This analysis shows that the Shannon entropy of the proposed TRNG design behaves well under temperature changes.

When considering the external magnetic field, a sufficiently high field can reduce the entropy to 0, as shown in FIGS. 6B and 6C. Every device using MTJs will be susceptible to a strong enough magnetic field, which can be exploited by an adversary. When the external magnetic field is perpendicular to the fixed layer magnetization (the fixed layer magnetization of all MTJs are parallel), from the symmetry of the MTJ the entropy is expected to be symmetrical around zero magnetic field, as confirmed in FIGS. 6C and 6D. Additionally, since an in-plane MTJ is used, the external field perpendicular to the MTJ layers has little influence on the entropy. Therefore, when designing the TRNG circuit, nearby wires are positioned in the same plane as the TRNG, and use vertical interconnect accesses (VIAs) as short as possible and positioned as far from the TRNG as possible.

Reference is made to FIGS. 7A and 7B, which show graphs of the effect of a constant external field in different angles and fixed magnitude of $$10 \, k\frac{A}{m}$$

on the entropy of a 6-bit TRNG for the min-entropy and the Shannon entropy, respectively, wherein φ is the angle of the field from the axis perpendicular to the MTJ plane, θ is the in-plane angle from the magnetization of the fixed layer.

To further consider an external magnetic field, the effect for other directions of the field relative to the fixed layer magnetization of the MTJs was simulated. FIGS. 7A-7B show the effect of the direction of an external field with a magnitude of $$10 \, k\frac{A}{m}$$

on a 6-bit TRNG. The worst effect is for approximately θ=45°\315°, rather than in the direction of the fixed-layer magnetization (θ=0°\180°) or perpendicular to it (θ=90°\270°).

Reference is made to FIGS. 8A and 8B, which show graphs of the effect of an alternating external field on multiple in-plane directions and fixed magnitude of $$10 \, k\frac{A}{m}$$

on a 6-bit TRNG, in accordance with some embodiments.

FIGS. 8A and 8B show how an alternating external field applied from multiple directions, with a fixed magnitude of $$10k\frac{A}{m}$$

and different frequencies, affects a 6-bit TRNG. Since a field perpendicular to the MTJ affects the entropy much less than other directions, the alternating field simulation was limited only to the in-plane directions. In some embodiments, the Enable step duration is 10 ns (such as depicted by Table 1), which corresponds to a 100 MHz frequency.

An interesting result is that the performance under an alternating external field in the range of 50 MHz to 1 GHz is actually better than the performance under a constant external field. This implies that nearby circuits at frequencies up to 1 GHz will induce minimal performance loss. Another observation is that an alternating external field above a certain frequency is very effective. Countermeasures against external fields are discussed elsewhere herein.

Process Variation

Process variation in the TRNG will result in different switching probabilities for the different MTJs, biasing some to switch with higher probabilities and some with lower probabilities, resulting in bias for certain output words. However, the i.i.d. property of the TRNG is not affected by process variation: it affects only the distribution of an output word but not the dependencies between different output words. Hence, the methodology presented in previous sections is used in this section as well.

Variations in the MTJs and in the transistors operating in the Enable step have been considered. As described in greater detail elsewhere herein, reasonable variation in capacitor C does not change the entropy; hence, C is not considered for process variation. For the transistors, variations were modeled in their fixed resistance. For the MTJ, variations were modeled in the physical size of the devices: major and minor axis length (in some embodiments, the MTJ shape is an ellipse cylinder), the thickness of the free layer, and the thickness of the oxide layer (tunnel barrier layer). 1000 different instances were generated for each TRNG topology, and their entropy was evaluated. The parameters were drawn independently from a Gaussian distribution with mean as the designed value (listed in Table 1) and a standard deviation of 5%.

The geometry of the MTJ affects its demagnetization factors and resistance. The method presented in Vincent [2015] was used to compute the new demagnetization factors. The MTJ resistance is proportional to the exponent of the oxide layer thickness ($t_{ox}$) and inversely proportional to its area (A) (J. Li, C. Augustine, S. Salahuddin, and K. Roy, "Modeling of failure probability and statistical design of spin-torque transfer magnetic random access memory (STT MRAM) array for yield enhancement," in Proc. 45th Annu. Design Autom. Conf. (DAC), 2008, pp. 278-283.), i.e., $$R_{on}, R_{off} \propto \frac{e^{\rho \cdot t_{ox}}}{A}$$

(ρ is a constant that depends on the device technology). The thickness of the oxide layer appears in the simulation only as part of the MTJ resistance. Since the oxide layer thickness and the coefficient ρ are unavailable for the simulated device, the process variation of the oxide layer was evaluated as an additional variation in the MTJ resistance by a Gaussian distribution with a standard deviation of 5%. The simulation results are listed in Table 3. The results show that the entropy per bit increases with the number of MTJs, resulting in a twofold increase in the TRNG total entropy.

Even though most TRNG instances will have sufficiently high entropy under process variation, some TRNG instances might still produce low entropy and be unusable. To protect the TRNG from such an event, several TRNG instances should be fabricated together. Fortunately, the largest area is consumed by the capacitor C and the sense amplifier (see Section 4.6), which can be shared among the different fabricated MTJ modules (the implications of this suggestion are not discussed in this paper). Thus, the process variation robustness can be increased with a low area overhead.

Entropy Generating Rate

In many systems, a large number of entropy bits are required. In this case, the entropy generating rate (entropy bits per second) is the desired performance metric. Nevertheless, the TRNG is not required for the entire operation of the system, since there is no need for random words most of the time. The generating rate gives a notion of the delay time between starting the TRNG and having the desired number of entropy bits, enabling the system to react faster. Since many TRNG generated numbers are involved, the generating rate refers to the Shannon entropy. The entropy generating rate is measured in units of entropy bits per second, which is the amount of entropy produced by the TRNG in a second.

TABLE 3

Entropy results with process variation showing the average, standard deviation, median, and the 10th percentile. In Table 3, the 8-bit TRNG was simulated 6000 iterations.

| | Shannon Entropy per Bit | | | | Min-Entropy per Bit | | | |
|---|---|---|---|---|---|---|---|---|
| N | Avg. | sd | Med. | $P_{10}$ | Avg. | sd | Med. | $P_{10}$ |
| 2 | 0.74 | 0.19 | 0.76 | 0.46 | 0.46 | 0.21 | 0.47 | 0.17 |
| 4 | 0.79 | 0.12 | 0.80 | 0.64 | 0.51 | 0.14 | 0.51 | 0.33 |
| 6 | 0.82 | 0.08 | 0.83 | 0.72 | 0.54 | 0.10 | 0.55 | 0.41 |
| 8 | 0.86 | 0.06 | 0.86 | 0.78 | 0.58 | 0.08 | 0.59 | 0.47 |

To determine the entropy generation rate, all three operation steps should be considered. The Reset step duration is dominated by the capacitor charging time. If the pass gate P1–N1 is modeled by connecting the capacitor to $V_{init}$ (FIG. 2) as a resistor of 1.5KΩ, the capacitor charging time from 0V to 0.79V (98.8%) is 66 ns. The duration of the Enable step is 10 ns (Table 1). In the Read step, the states of the MTJs are read using sense amplifiers. If the read latency of 2.8 ns reported by (Q. Dong, "A 1 Mb 28 nm STT-MRAM with 2.8 ns read access time at 1.2 V VDD using single-cap offset-cancelled sense amplifier and in-situ self-write-termination," in IEEE Int. Solid-State Circuits Conf. (ISSCC) Dig. Tech. Papers, February 2018, pp. 480-482.) is used, an output is produced every 78.8 ns.

For an 8-bit TRNG with process variation, 90% of instances have an entropy generation rate between 79.2 Mbps and 101.5 Mbps. This rate can be improved by terminating the Enable step earlier (as seen in FIG. 6A) and by reducing the charging time (since the capacitor is not fully discharged immediately after an operation). For an 8-bit TRNG, the entropy generation rate can be improved to 99.7-127.8 Mbps for 90% of the instances. However, the actual generation rate of the proposed design depends on the system clock used to measure the duration of the steps; the computed times represent the best case.

Area and Energy

Figure 3A:
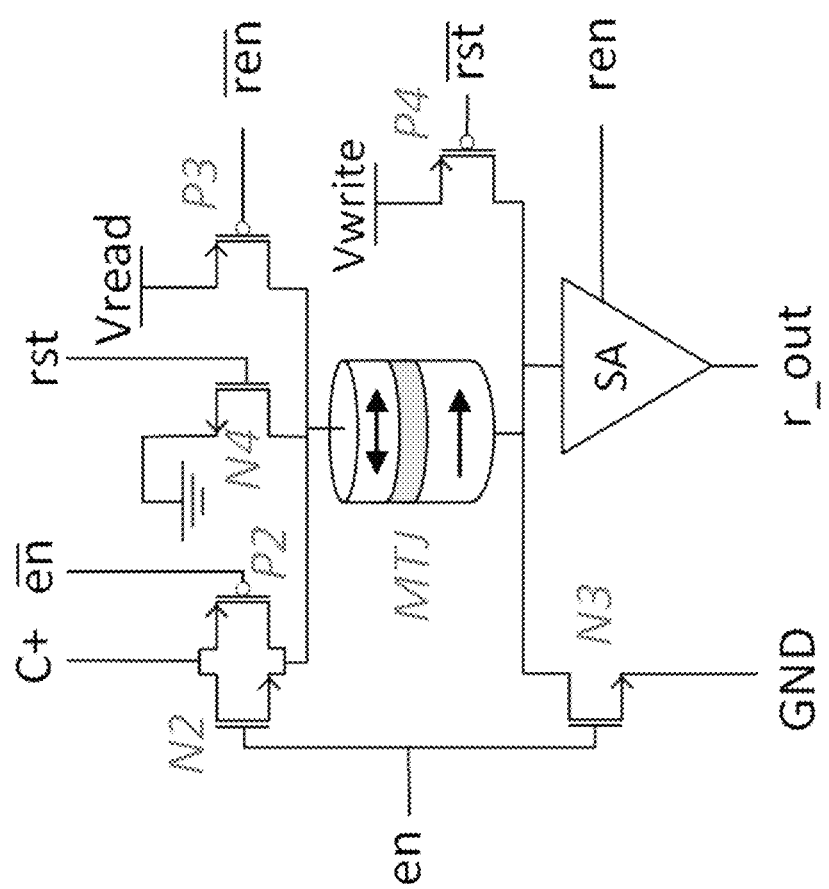
FIG. 3A is a schematic simplified illustration of the proposed TRNG consists of an N parallel connected MTJ-modules and a capacitor.
Figure 3B:
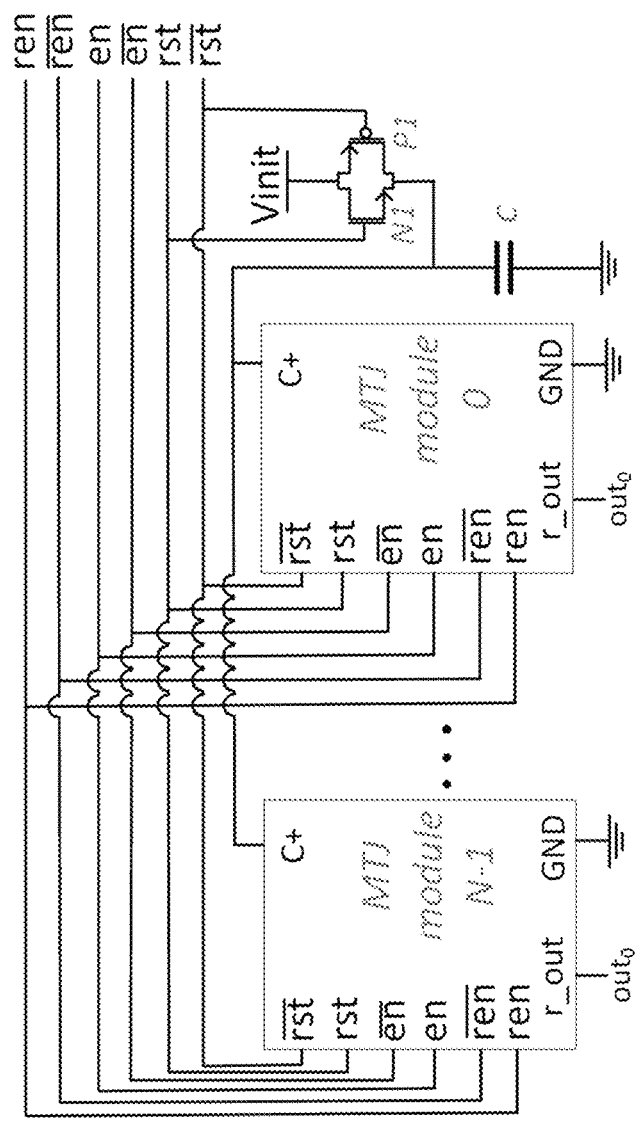
FIG. 3B is a schematic simplified illustration of an MTJ module.

To estimate the area of the TRNG, the area of each component in the proposed circuit was evaluated. The area of a single STT-MTJ device is 0.003 μm² (Vincent [2015]). To find the capacitor C area, it was modeled as a MOS capacitor with GlobalFoundries 28 nm technology and obtained an area of 400 μm² using Cadence Virtuoso. The sense amplifier area from (Li [2008]) was evaluated as the summed area of its transistors. All transistors were evaluated with a width of 500 nm and minimum length (transistor sizes are not specified in (Li [2008]). (This size upper bounds the area of the transistors shown in FIGS. 3A and 3B.) The resulting area of an MTJ module is 0.395 μm². The sense amplifier in (Li [2008]) uses an additional capacitor, but its area is relatively small since the read duration is 2.8 ns. Hence, each MTJ module area was approximated as 0.6 μm². Table 4 lists the TRNG area for different N.

Reference is made to FIG. 9, which shows a graph of the capacitor capacitance as a function of a generated assistance magnetic field while preserving the entropy. In FIG. 9, the field is in the direction of the fixed layer magnetization.

In order to reduce the area, the number of sense amplifiers can be lowered by reading the MTJs sequentially or by sharing sense amplifiers with a nearby MTJ memory array. However, the major area contributor is the capacitor C. Using a capacitor other than a MOS capacitor to reduce the area is left as future work. Alternatively, it is possible to lower the capacitance (and hence the size of the capacitor) while maintaining the same switching distribution, but this requires reducing the number of MTJs and\or using larger transistors (reducing their resistance) to preserve the same current through the MTJs. Another option is to use MTJ devices with a higher switching probability for the same current, which will require a smaller capacitor but will increase the sensitivity of the design to external magnetic fields.

A different option is to use a generated magnetic field by a dedicated wire. The magnetic field will raise the switching probability; hence, a smaller current will be needed to produce the same entropy, also resulting in a smaller capacitor. FIG. 9 shows the relationship between the generated magnetic field (in the direction of the fixed layer magnetization) and the capacitor required to achieve high entropy per bit (close to 1). Additionally, the generated magnetic field might be dynamically adjusted to compensate for the effects of process variation and parameter drift of the circuit. However, such a solution might incur an area overhead and design complications. Precise analysis of such a solution is left for future research.

The energy of the TRNG in the Reset and Read steps is for capacitor charging, switching from P to AP of the MTJs (at the Reset step), and for the read operation. The Enable step only uses the energy stored in the capacitor. The energy required to charge the capacitor is the energy the capacitor holds, 3.2 pJ, plus another 3.2 pJ consumed on the passgate connected to it (transistors N1 and P1 in FIG. 2), for a passgate effective resistance of 1.5KΩ and Reset step time of 66 ns. The MTJs have a write energy of 4.5 pJ and a read energy of 0.7 pJ (Li [2008]). Table 4 lists the energy per bit and power for different N.

TABLE 4

Comparison of entropy generation rate, area, energy, and power of the proposed TRNG with CMOS TRNGs. For table 4, the numbers for the proposed TRNG are presented for 90% of instances and for the highest generating rate.

| | Entropy Generation Rate $\left[\frac{Mb}{s}\right]$ | Area [μm²] | Energy per bit $\left[\frac{pJ}{entropybit}\right]$ | Power [mW] |
|---|---|---|---|---|
| 2-bit TRNG | 15.4-33.4 | 401.2 | 6.16-13.4 | 0.2 |
| 4-bit TRNG | 40.9-63.8 | 402.4 | 5.9-9.2 | 0.38 |
| 6-bit TRNG | 66.7-92.7 | 403.6 | 5.8-8.0 | 0.54 |
| 8-bit TRNG | 94.0-120.6 | 404.8 | 5.7-7.3 | 0.7 |
| K. Yang, D. Fick, M. B. Henry, Y. Lee, D. Blaauw, and D. Sylvester, | 23.16 | 375 | 23 | 0.54 |

TABLE 4-continued

Comparison of entropy generation rate, area, energy, and power of the proposed
TRNG with CMOS TRNGs. For table 4, the numbers for the proposed TRNG
are presented for 90% of instances and for the highest generating rate.

| | Entropy Generation Rate $\left[\frac{Mb}{s}\right]$ | Area [μm²] | Energy per bit $\left[\frac{pJ}{entropybit}\right]$ | Power [mW] |
|---|---|---|---|---|
| "A 23 Mb/s 23 pJ/b fully synthesized true-random-number generator in 28 nm and 65 nm CMOS," in *IEEE Int. Solid-State Circuits Conf.* (ISSCC) Dig. Tech. Papers, February 2014, pp. 280-281. | | | | |
| S. Srinivasan, "2.4 GHz 7 mW all-digital PVT-variation tolerant true random number generator in 45 nm CMOS," in *Proc. Symp. VLSI Circuits*, June 2010, pp. 203-204. | 2400 | 4004 | 2.9 | 7 |

Comparison to Other TRNGs

Table 4 compares the proposed design with two different state-of-the-art CMOS based TRNGs. The proposed TRNG has a high entropy generation rate and low energy per bit as compared to CMOS TRNGs with a similar area and power.

Yang et al.'s (Yang, 2014) TRNG is based on Ring Oscillators (RO) with a 28 nm CMOS process node. The design of the TRNG includes several ROs, each controlling a 14-bit counter to measure an event (private for each RO). The resulting counter is random due to the noise in the RO and serves as the output. Only a subset of the counter's bits is used to produce a uniform distribution. This TRNG has similar area and power as the proposed TRNG. The proposed 8-bit TRNG has 4× to 5× higher entropy rate, and 3× to 4× better energy per bit than the TRNG of Yang [2014].

In Srinivasan [2010] TRNG is based on a metastable latch with a 45 nm CMOS process node. It has 10× larger area and consumes 10× more power. The metastable latch TRNG is 20×-24× faster and consumes 2×-2.6× less energy per bit than the 8-bit proposed design. Nevertheless, the design proposed by Srinivasan [2010] generates a single random bit every clock cycle, requiring the use of a 2.4 GHz clock to achieve the high entropy rate. The use of a high rate clock and the relatively large area make this design impractical for low-power and low-frequency devices.

Dealing with an Adversary

Consider an attack model where the attacker can change the environmental conditions of the TRNG. For example, the attacker can place a fixed magnet in proximity to the TRNG to control the external magnetic field, or use an antenna, or remotely control a circuit close to the TRNG (such as a processor). However, the adversary is assumed to not have physically invasive access.

Temperature has little effect on the TRNG and therefore is not an interesting attack venue. On the other hand, the external magnetic field on the TRNG can decrease the entropy substantially. Passive shielding can mitigate the effect of an external field. A different approach to interference is detection. This can be done using online tests that check for a certain amount of randomness. Once the randomness is below a specific threshold, an error should be sent to the operating entity, informing it of nearby interference or an ongoing attack. This solution will not prevent the attack, but it might convert it to a denial-of-service attack.

The present invention discloses an asynchronous TRNG that utilizes the random switching time of STT-MTJ devices. The TRNG was comprehensively evaluated in simulations using the physical equations describing the STT-MTJs. The evaluation showed that by increasing the number of STT-MTJs in the design, the TRNG can have greater entropy per output and better resilience to process variation. Furthermore, the design achieves better throughput than current CMOS TRNGs, with lower energy per bit and similar die area and power dissipation. However, MTJ devices are susceptible to attacks controlling the external magnetic field, requiring the use of additional countermeasures.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating true random numbers, comprising:
    charging a capacitor to an initial voltage;
    applying a current through an array comprising n magnetic tunnel junctions (MTJ), thereby switching the MTJs to a high resistance initial state;
    connecting the array of MTJs in parallel to said capacitor, thus discharging said capacitor through said MTJs, causing a random subset of said MTJs to switch to a lower resistance state;
    determining a post-discharging resistance state of each of the MTJs; and
    assigning a logical state to each of said MTJs corresponding to said resistance state of said MTJ.

2. The method according to claim 1, wherein said assigning comprises assigning a logical '1' to each MTJ in said random subset, and a logical '0' to all other MTJs, and arranging said 1s and said 0s into an n-bit word, wherein said n-bit word is a true random word.

3. The method according to claim 2, wherein said arranging is based on a sequence of said MTJs in said array.

4. The method according to claim 1, wherein a number of MTJs to be included in said random subset is determined based, at least in part, on at least one of:
    (i) the number n of said MTJs in said array; and
    (ii) said initial voltage.

5. The method according to claim 1, wherein said initial voltage is set so as to cause a desired number of said MTJs to switch to said lower resistance state.

6. The method according to claim 1, wherein an earliest time of said determining of said post-discharging resistance state of each of said MTJs is calculated based, at least in part, on said initial voltage.

7. The method according to claim 1, wherein said high resistance state includes a free layer of said MTJs being anti-parallel to a fixed layer of said MTJ and wherein said low resistance state includes a free layer of said MTJs being parallel to a fixed layer of said MTJ.

8. The method according to claim 1, wherein said discharging is effected by switching said electrical energy source capacitor to a discharging state using at least one transistor.

9. The method according to claim 1, wherein said determining comprises applying a small current through each of said MTJs and using a sense amplifier to determine the resistance state of each of said MTJs.

10. The method according to claim 1, wherein said discharging comprises a complete discharging of said electrical energy source.

11. A system for generating true random numbers, comprising:
    a capacitor, configured to be charged to an initial voltage;
    an array comprising n magnetic tunnel junctions (MTJ) connected in parallel to said capacitor;
    a switch configured to permit said capacitor to be discharged through said MTJs; and
    a sensing module configured to determine a resistance state of each of said MTJs.

12. The system according to claim 11, wherein said initial voltage is set so as to cause a desired number of said MTJs in said array to switch to said lower resistance state, based, at least in part, on said number n of said MTJs in said array.

13. The system according to according to claim 11, wherein said system is used for generating an n-bit true random word, by:
    (i) discharging said capacitor through said MTJs;
    (ii) applying said sensing module to determine a post-discharging resistance state of each of the MTJs;
    (iii) assigning a logical state of '1' or '0' to each of said MTJs corresponding to said post-discharging resistance state of said MTJ; and
    (iv) arranging said 1s and said 0s into an n-bit word, wherein said arranging is based on a sequence of said MTJs in said array.

14. The system according to claim 13, wherein an earliest time of said determining of said post-discharging resistance state of each of said MTJs is calculated based, at least in part, on said specified initial voltage.

15. The system according to claim 11, wherein said high resistance state includes a free layer of said MTJs being anti-parallel to a fixed layer of said MTJ, and wherein said low resistance state includes a free layer of said MTJs being parallel to a fixed layer of said MTJ.

16. The system according to claim 11, wherein said switch comprises at least one transistor.

17. The system according to claim 11, wherein said sensing module comprises a sense amplifier.

* * * * *